US010384744B2

(12) United States Patent
Miki et al.

(10) Patent No.: US 10,384,744 B2
(45) Date of Patent: Aug. 20, 2019

(54) BICYCLE OPERATING DEVICE

(71) Applicant: Shimano Inc., Sakai, Osaka (JP)

(72) Inventors: Yoshimitsu Miki, Osaka (JP); Shun Kakehashi, Osaka (JP); Naoki Fujimoto, Osaka (JP); Shohei Yonehama, Osaka (JP); Tsuyoshi Nakamura, Osaka (JP)

(73) Assignee: Shimano Inc., Osaka (JP)

( * ) Notice: Subject to any disclaimer, the term of this patent is extended or adjusted under 35 U.S.C. 154(b) by 285 days.

(21) Appl. No.: 15/161,537

(22) Filed: May 23, 2016

(65) Prior Publication Data

US 2017/0334521 A1 Nov. 23, 2017

(51) Int. Cl.
*B62M 25/04* (2006.01)
*B62K 23/06* (2006.01)

(52) U.S. Cl.
CPC ............ *B62M 25/04* (2013.01); *B62K 23/06* (2013.01)

(58) Field of Classification Search
CPC ........ B62K 23/06; B62K 23/02; B62M 25/04; B62M 25/02; B62M 2701/0053; B62L 3/026; B62L 3/02; B62L 3/023; B60T 7/102; B60T 7/10
See application file for complete search history.

(56) References Cited

U.S. PATENT DOCUMENTS

| | | | | |
|---|---|---|---|---|
| 7,779,718 | B2 | 8/2010 | Jordan et al. | |
| 8,752,450 | B2 | 6/2014 | Fukao et al. | |
| 9,056,597 | B2 | 6/2015 | Fukao | |
| 2001/0053724 | A1* | 12/2001 | Campagnolo .......... | B62M 25/08 474/80 |
| 2007/0068318 | A1 | 3/2007 | Jordan et al. | |
| 2007/0193389 | A1* | 8/2007 | Kawakami ............. | B62K 23/06 74/502.2 |
| 2008/0022803 | A1* | 1/2008 | Funai ..................... | B62K 23/06 74/502.2 |
| 2008/0098848 | A1 | 5/2008 | Dal Pra' et al. | |
| 2012/0297919 | A1 | 11/2012 | Fukao et al. | |
| 2014/0109718 | A1* | 4/2014 | Tan ........................ | B62M 25/04 74/523 |
| 2015/0151812 | A1 | 6/2015 | Miki | |

FOREIGN PATENT DOCUMENTS

| | | |
|---|---|---|
| CN | 102343960 A | 2/2012 |

* cited by examiner

*Primary Examiner* — Daniel D Yabut
(74) *Attorney, Agent, or Firm* — Global IP Counselors, LLP

(57) ABSTRACT

A bicycle operating device is basically provided with a base member, a first operating member and an attachment. The base member has an interior space that is configured to receive an operating unit. The first operating member is configured to move along a first operating path from a rest position to an operated position to operate the operating unit when the operating unit is disposed in the interior space. The attachment blocks the first operating path to prevent movement of the first operating member from reaching the operated position.

19 Claims, 21 Drawing Sheets

BICYCLE OPERATING DEVICE

BACKGROUND

Field of the Invention

This invention generally relates to a bicycle operating device. More specifically, the present invention relates to a bicycle operating device having an operating member for operate an operating unit.

Background Information

Many bicycles have bicycle components that are operated by a bicycle operating device. For example, a gear shift operating device (bicycle shifter) is one example of a bicycle operating device. In this type of gear shift operating device, a bicycle component operating unit is often provided for controlling a shifting device for changing speed stages. The gear shift operating device is connected to the shifting device with, for example, a Bowden-type gear shift cable. The gear shift operating device is configured and arranged to allow a user to operate the shifting device by operating, for example, a lever or other such operating member of the gear shift operating device. One example of a bicycle operating device (bicycle shifter) is disclosed in U.S. Patent Application Publication No. 2012/0297919A1, which is assigned to Shimano Inc.

SUMMARY

Generally, the present disclosure is directed to various features of a bicycle operating device.

In view of the state of the known technology and in accordance with a first aspect of the present disclosure, a bicycle operating device is provided that basically comprises a base member, a first operating member and an attachment. The base member has an interior space that is configured to receive an operating unit. The first operating member is configured to move along a first operating path from a rest position to an operated position to operate the operating unit when the operating unit is disposed in the interior space. The attachment blocks the first operating path to prevent movement of the first operating member from reaching the operated position.

In accordance with a second aspect of the present invention, the bicycle operating device according to the first aspect is configured so that the first operating member is pivotally mounted relative to the base member about a first pivot axis to move along the first operating path.

In accordance with a third aspect of the present invention, the bicycle operating device according to the second aspect is configured so that the first operating member is a lever that is pivotally mounted relative to the base member about a second pivot axis to move along a second operating path. The first pivot axis is transversely, arranged with respect to the second pivot axis.

In accordance with a fourth aspect of the present invention, the bicycle operating device according to any one of the first to third aspects further comprises a second operating member configured to move along a third operating path from a rest position to an operated position to operate the operating unit when the operating unit is disposed in the interior space.

In accordance with a fifth aspect of the present invention, the bicycle operating device according to the fourth aspect is configured so that the attachment blocks the third operating path to prevent movement of the second operating member from reaching the operated position of the second operating member.

In accordance with a sixth aspect of the present invention, the bicycle operating device according to any one of the fourth to fifth aspects is configured so that the second operating member is pivotally mounted relative to the base member about a third pivot axis to move along the third operating path.

In accordance with a seventh aspect of the present invention, the bicycle operating device according to any one of the fourth to sixth aspects is configured so that the second operating member is pivotally mounted on the first operating member.

In accordance with an eighth aspect of the present invention, the bicycle operating device according to any one of the first to seventh aspects is configured so that the interior space is configured to removably receive the operating unit.

In accordance with a ninth aspect of the present invention, the bicycle operating device according to any one of the first to eighth aspects is configured so that the operating unit is a shifting unit.

In accordance with a tenth aspect of the present invention, the bicycle operating device according to any one of the first to ninth aspects is configured so that the attachment is coupled to the base member.

In accordance with an eleventh aspect of the present invention, the bicycle operating device according to any one of the first to tenth aspects is configured so that the base member is configured as a road shifter bracket that includes a grip portion with a handlebar receiving recess and a pommel portion that is disposed at an opposite end of the grip portion from the handlebar receiving recess.

In accordance with a twelfth aspect of the present invention, the bicycle operating device according to the eleventh aspect is configured so that the attachment defines a part of a downwardly facing bottom surface of the grip portion.

In accordance with a thirteenth aspect of the present invention, the bicycle operating device according to the second aspect further comprises a second operating member configured to move along a third operating path from a rest position to an operated position to operate the operating unit when the operating unit is disposed in the interior space. The attachment blocks the third operating path to prevent movement of the second operating member from reaching the operated position of the second operating member.

In accordance with a fourteenth aspect of the present invention, the bicycle operating device according to the thirteenth aspect is configured so that the first operating member is a lever that is pivotally mounted relative to the base member about a second pivot axis to move along a second operating path. The first shift pivot axis is transversely arranged with respect to the second pivot axis. The second operating member is a lever that is pivotally mounted relative to the base member about a third pivot axis to move along the third operating path.

In accordance with a fifteenth aspect of the present invention, the bicycle operating device according to the fourteenth aspect is configured so that the attachment includes a first abutment and a second abutment. The first abutment blocks pivotal movement of the first operating member from reaching the operated position of the first operating member. The second abutment blocks pivotal movement of the second operating member from reaching the operated position of the second operating member.

In accordance with a sixteenth aspect of the present invention, the bicycle operating device according to any one of the eleventh to fifteenth aspects is configured so that the operating unit is detachably disposed in the interior space; and the attachment retains the operating unit in the interior space.

In accordance with a seventeenth aspect of the present invention, the bicycle operating device according to the eleventh aspect is configured so that the attachment defines a part of an inwardly facing side surface of the grip portion.

In accordance with an eighteenth aspect of the present invention, the bicycle operating device according to the seventeenth aspect is configured so that the operating unit is detachably disposed in the interior space; and the attachment retains the operating unit in the interior space.

In accordance with a nineteenth aspect of the present invention, the bicycle operating device according to the first aspect further comprises a second operating member that is pivotally mounted relative to the base member about a pivot axis to move along a second operating path that is transverse to the first operating path of the first operating member.

In accordance with a twentieth aspect of the present invention, the bicycle operating device according to the nineteenth aspect is configured so that the first operating member is pivotally mounted relative to the base member about a pivot axis to move along the first operating path that is transverse to the second operating path of the first operating member.

In accordance with a twenty-first aspect of the present invention, the bicycle operating device according to any one of the nineteenth to twentieth aspects is configured so that the operating unit is detachably disposed in the interior space; and the attachment retains the operating unit in the interior space.

In accordance with a twenty-second aspect of the present invention, the bicycle operating device according to the ninth aspect is configured so that the first operating member moves along the first operating path for a first distance to perform a cable pulling operation of the shifting unit and moves along the first operating path for a second distance to perform a cable releasing operation of the shifting unit; and the first distance is different from the second distance.

In accordance with a twenty-third aspect of the present invention, an attachment is provided for a bicycle operating device that includes an operating member. The attachment comprises a fixed portion and an abutment portion. The fixed portion is configured to be coupled to the bicycle operating device. The abutment portion blocks a first operating path of the operating member to prevent operating movement of the operating member.

Also other objects, features, aspects and advantages of the disclosed bicycle operating device will become apparent to those skilled in the art from the following detailed description, which, taken in conjunction with the annexed drawings, discloses two illustrative embodiments of the bicycle operating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
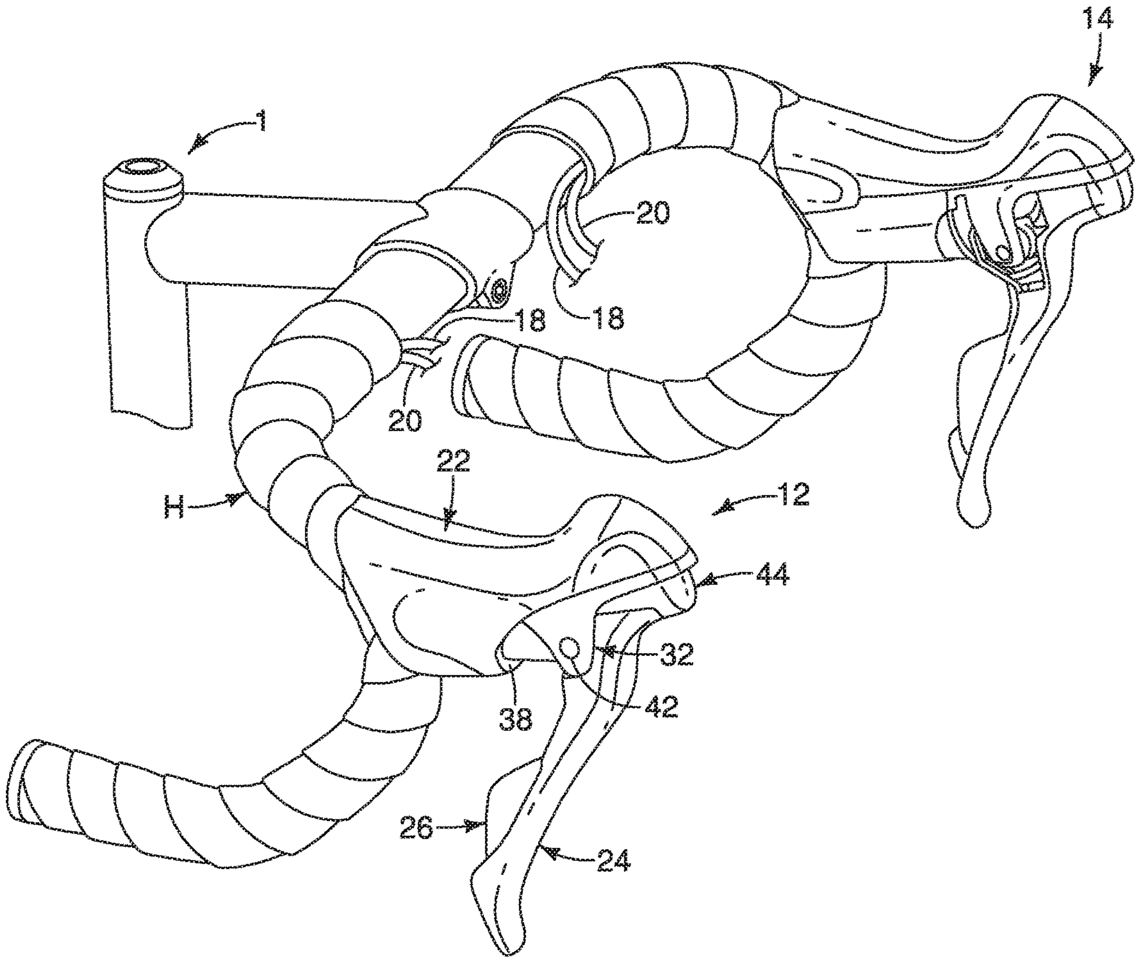
FIG. 1 is a front perspective view of a portion of a bicycle equipped with a pair of bicycle operating devices in accordance with a first illustrative embodiment in which the bicycle operating devices are coupled to a drop type handlebar in their installed positions.

Referring initially to FIG. 1, a portion of a bicycle 1 is illustrated that is equipped with a pair of bicycle operating devices 12 and 14 in accordance with one illustrative embodiment. The bicycle operating devices 12 and 14 are mounted on a drop handlebar H in accordance with the illustrated embodiment as seen in FIG. 1. The bicycle operating devices 12 and 14 are mounted to the downwardly curved portions of the drop down handlebar H. The bicycle operating devices 12 and 14 are each configured to operate a brake device (not shown) and a shifting device (not shown). In the illustrated embodiment, the bicycle operating devices 12 and 14 are essentially identical in operation, except that they are mirror images of each other and they may have a different number of shifting operations. In other words, the bicycle operating device 14 is substantially identical to the bicycle operating device 12, except that the bicycle operating device 14 has been modified to be a mirror image and to decrease the number of gears that can be shifted.

Figure 2:
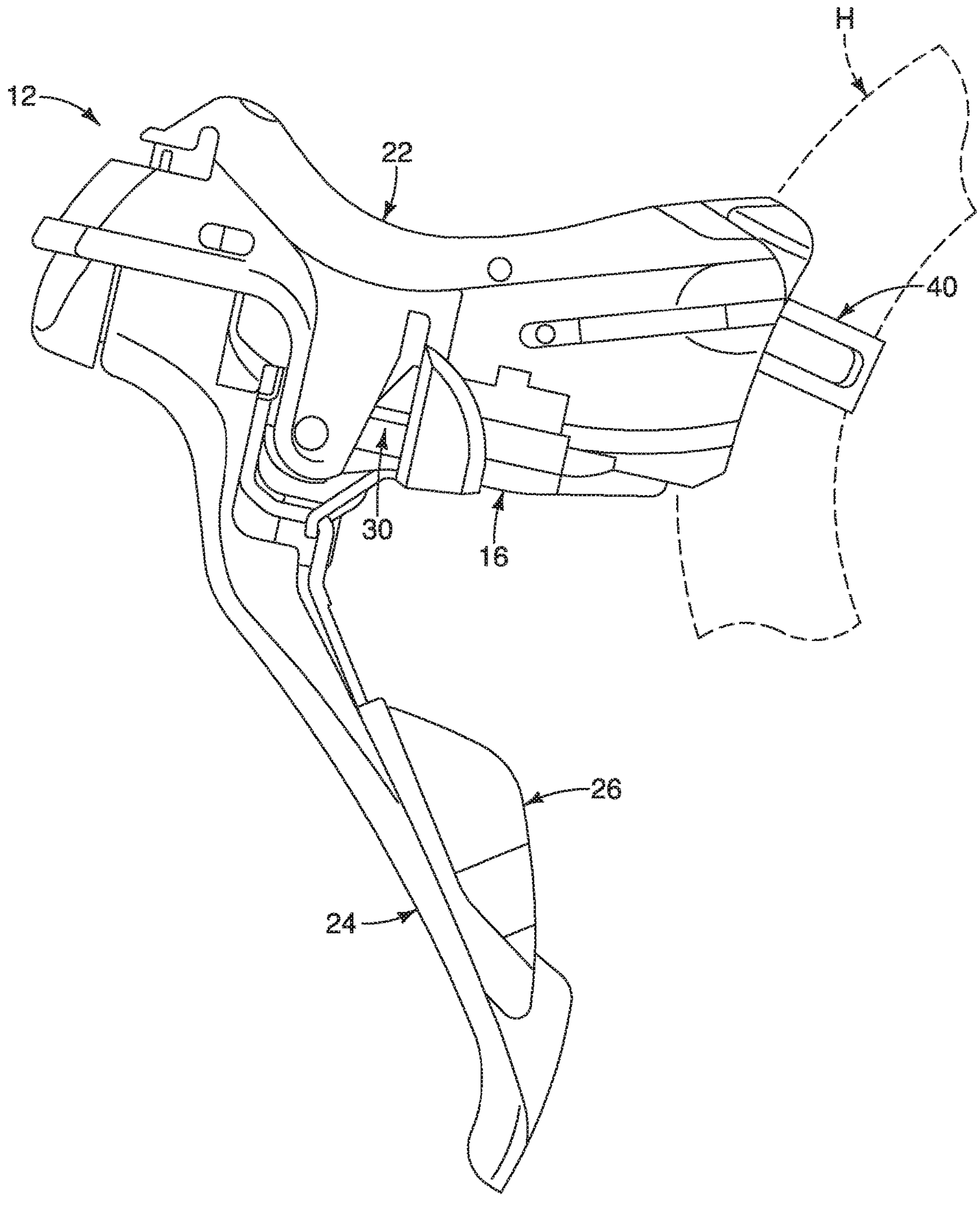
FIG. 2 is an inside elevational view of the right bicycle operating device illustrated in FIG. 1 with first and second operating members in their rest positions (non-operated position) with respect to a base member that is supported on the handlebar and an attachment mounted to the base member to prevent movement of the first and second operating members from their rest positions (non-operated position) with respect to a base member along shift operating paths but allowing the first operating member to move along a braking path.

As explained below in more detail, the bicycle operating devices 12 and 14 are each configured to be used for both a braking operation and a shifting operation. However, as explained below, the bicycle operating devices 12 and 14 can be modified to eliminate shifting operation. In other words, the bicycle operating devices 12 and 14 can each be used solely for braking, or for both for braking and shifting. In particular, as seen in FIG. 2, the bicycle operating device 12 is configured to be easily converted to a brake only operating device by using an attachment 16 that is attached to the bicycle operating device 12. Similarly, the bicycle operating device 14 can also be easily converted to a brake only operating device by using the attachment 16. The attachment 16 can be either sold separately from the bicycle operating devices 12 and 14, or can be part of a kit that includes one or both of the bicycle operating devices 12 and 14 and one or two of the attachments 16. As seen in FIG. 2, with the attachment 16 attached to the bicycle operating device 12, the bicycle operating device 12 can only be operated to perform a braking function, while a shifting function of the bicycle operating device 12 is disabled with used of the attachment 16. The details of the attachment 16 will be discussed later.

The bicycle operating device 12 is a right hand side operating device operated by the rider's right hand to operate a first brake device and a first shifting device (e.g., a cable operated rear derailleur) while the attachment 16 is not installed. The bicycle operating device 14 is a left hand side operating device operated by the rider's left hand to operate a second brake device and a second shifting device (e.g., a cable operated front derailleur). The first and second shifting devices are part of a conventional bicycle driving system that is used to change speed stages of the drive train in a relatively conventional manner. In the illustrated embodiment, the bicycle operating devices 12 and 14 are operatively coupled to the first and second shifting devices via shift control cables 18 and to the first and second brake device via brake control cables 20. Of course, it will be apparent from this disclosure that the bicycle operating devices 12 and 14 are not limited to being used with a brake device and a shifting device. Rather the bicycle operating devices 12 and 14 can be used for selectively operating other bicycle components.

Figure 3:
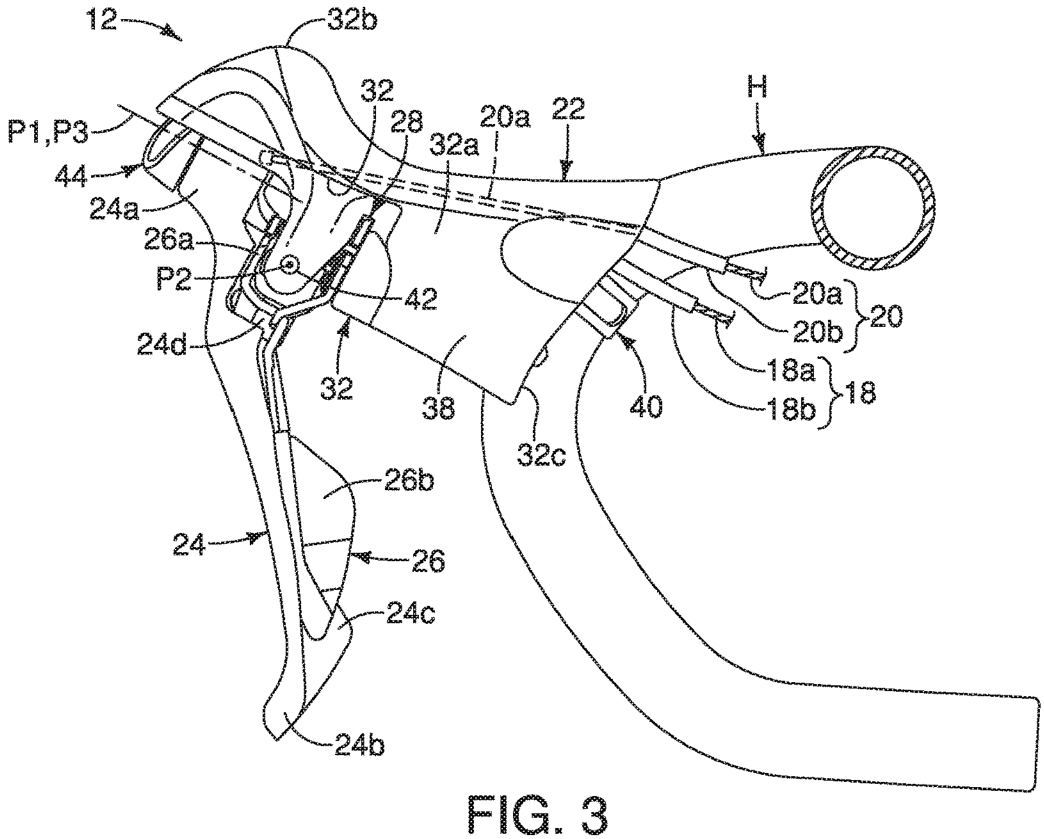
FIG. 3 is an inside elevational view of the right bicycle operating device illustrated in FIG. 1 with first and second operating members in their rest positions (non-operated position) with respect to a base member that is supported on the handlebar.
Figure 4:
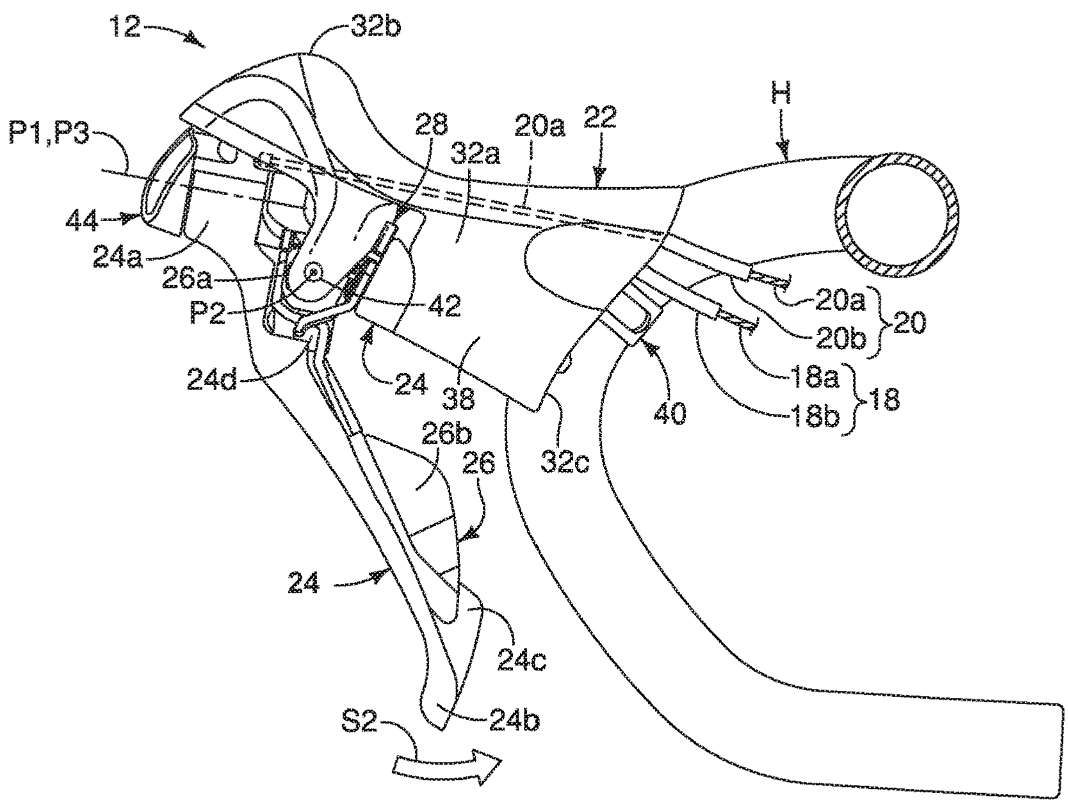
FIG. 4 is an inside elevational view of the right bicycle operating device illustrated in FIG. 3 with the first and second operating members pivoted to a braking position.

As seen in FIGS. 3 and 4, preferably, the control cables 18 and 20 are conventional bicycle operating cables that have an outer case covering an inner wire. In other words, each of the control cables 18 and 20 are Bowden type cables that basically include an inner wire slidably received within an outer case. For example, as seen in FIG. 3, the shift control cable 18 has an inner wire 18*a* with an outer case 18*b* covering the inner wire 18*a*, while the brake control cable 20 has an inner wire 20*a* with an outer case 20*b* covering the inner wire 20*a*. The inner wires 18*a* constitute connecting members that operatively connect the bicycle operating devices 12 and 14 to their respective shifting device for changing the speed stages in response to operation of the bicycle operating devices 12 and 14. The inner wire 20*a* constitute connecting members that operatively connect the bicycle operating devices 12 and 14 to their respective brake device for applying a braking force to a wheel in response to operation of the bicycle operating devices 12 and 14.

In view of the similarities, only the bicycle operating device 12 will be discussed and illustrated herein. Now the bicycle operating device 12 will be discussed in more detail. In the first embodiment, as best seen in FIGS. 3 and 4, the bicycle operating device 12 basically comprises a base member 22, a first operating member 24, a second operating member 26 and an operating unit 28. Here, the operating unit 28 is a shifting unit. Here, the base member 22 has an interior space 30 that is configured to receive the operating unit 28.

In the first embodiment, the first and second user operating members 24 and 26 are levers that pivot relative to the base member 22 for performing shifting operations. In other words, the first and second user operating members 24 and 26 are examples of user operated levers that are used for operating the operating unit 28 as discussed below. The first operating member 24 is also used for performing a braking operation as discussed below. Alternatively, the bicycle operating device 12 can be modified to have only a single dual function lever such that the bicycle operating device basically comprises a base member, a first operating member and an attachment member.

In the first embodiment, the first operating member 24 is operatively coupled to the operating unit 28 (i.e., the shifting unit) to perform a cable pulling operation. On the other hand, the second operating member 26 is operatively coupled to the operating unit 28 (i.e., the shifting unit) to perform a cable releasing operation. As explained below, the first operating member 24 is also configured to perform a braking operation. Thus, the bicycle operating device 12 is often referred to as a road "brifter". However, it will be apparent to those skilled in the bicycle field from this disclosure that with certain modifications to the bicycle operating device 12, the bicycle operating device 12 can be constructed such that only one of the first and second operating members 24 and 26 is provided to perform both the shifting and braking operations.

Figure 9:
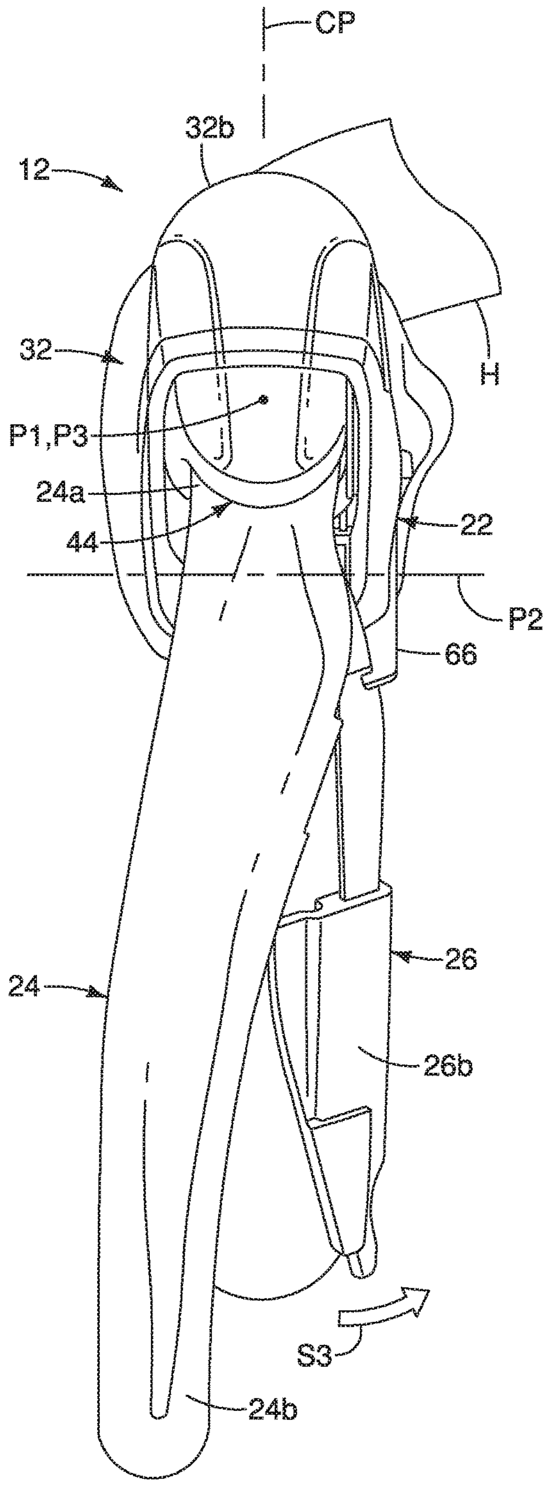
FIG. 9 is a front elevational view of the right bicycle operating device illustrated in FIGS. 3 to 8 with the first operating member moved to a cable releasing position in which an operating unit (i.e., a shifting unit) is operated, while the second operating member remains in the rest position.
Figure 10:
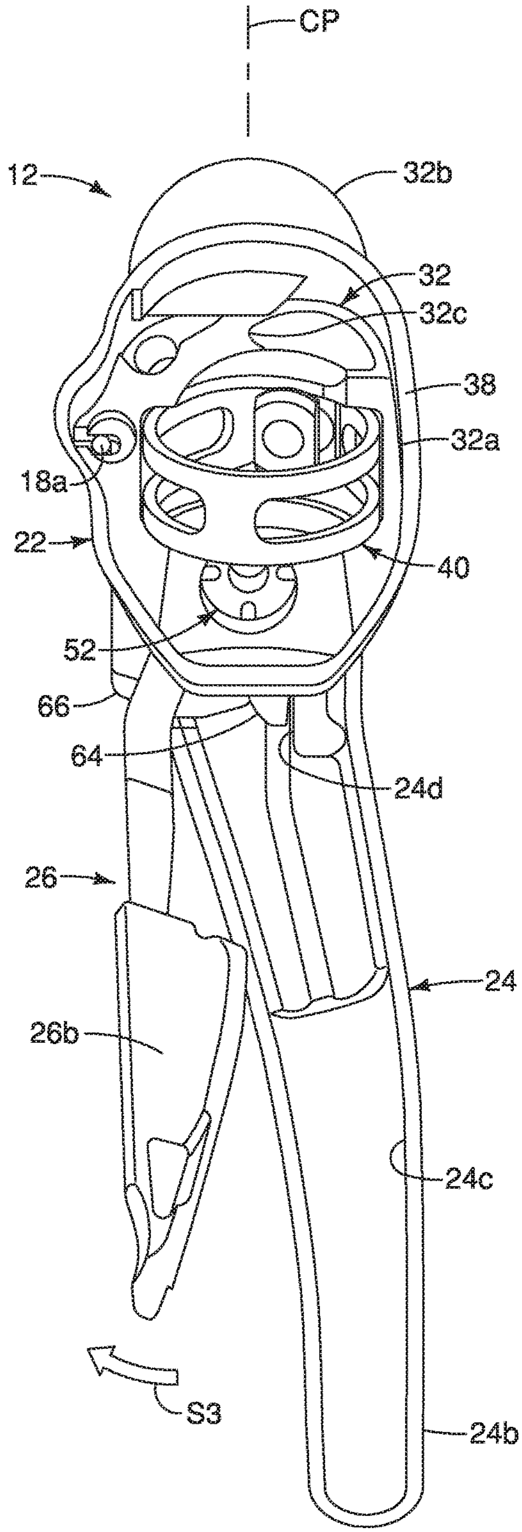
FIG. 10 is a rear elevational view of the right bicycle operating device illustrated in FIGS. 3 to 9 with the first operating member moved to the cable releasing position as illustrated in FIG. 9, while the second operating member remains in the rest position.

In the illustrated embodiment, the first and second user operating members 24 and 26 are trigger type levers that are biased to the rest positions in a conventional manner. In particular, the first operating member 24 is configured to move along a first operating path S1 from a rest position (FIGS. 5 and 6) to an operated position (FIGS. 7 and 8) to operate the operating unit 28 when the operating unit 28 is disposed in the interior space 30. The first operating member 24 is pivotally mounted relative to the base member 22 about a first pivot axis P1 to move along the first operating path S1. The first operating member 24 is a lever that is also pivotally mounted relative to the base member 22 about a second pivot axis P2 to move along a second operating path S2 (FIG. 4). The first pivot axis P1 is transversely arranged with respect to the second pivot axis P2. The second operating member 26 is configured to move along a third operating path S3 from a rest position (FIG. 6) to an operated position (FIGS. 9 and 10) to operate the operating unit 28 when the operating unit 28 is disposed in the interior space 30. The second operating member 26 is a lever that is pivotally mounted relative to the base member 22 about a third pivot axis P3 to move along the third operating path S3 (FIGS. 9 and 10). Here, as seen in FIGS. 3 and 4, the third pivot axis P3 is coaxially arranged with the first pivot axis P1. In the first embodiment, the second operating member 26 is pivotally mounted on the first operating member 24. The first and second user operating members 24 and 26 are each configured to pivot about a first pivot axis P1 for performing a shifting operation as discussed below. Also the first and second user operating members 24 and 26 are pivotally mounted as a unit on the base member 22 to pivot about a second pivot axis P2 for performing a braking operation as discussed below.

Figure 5:
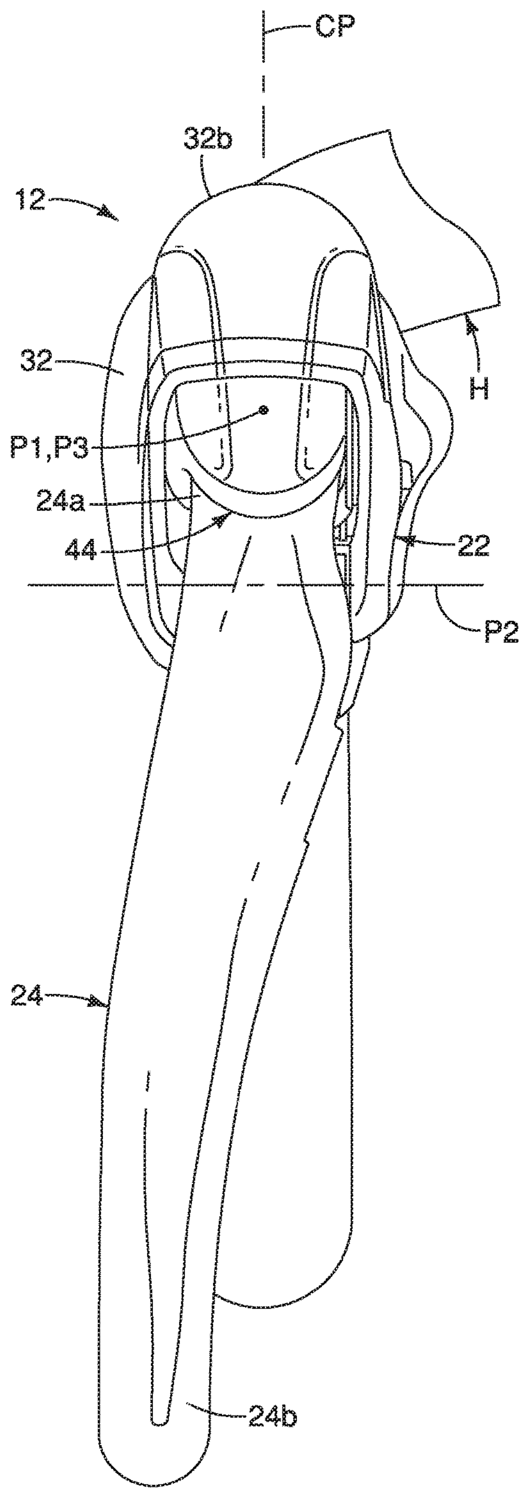
FIG. 5 is a front elevational view of the right bicycle operating device illustrated in FIGS. 3 and 4 with the first and second operating members in their rest positions.
Figure 6:
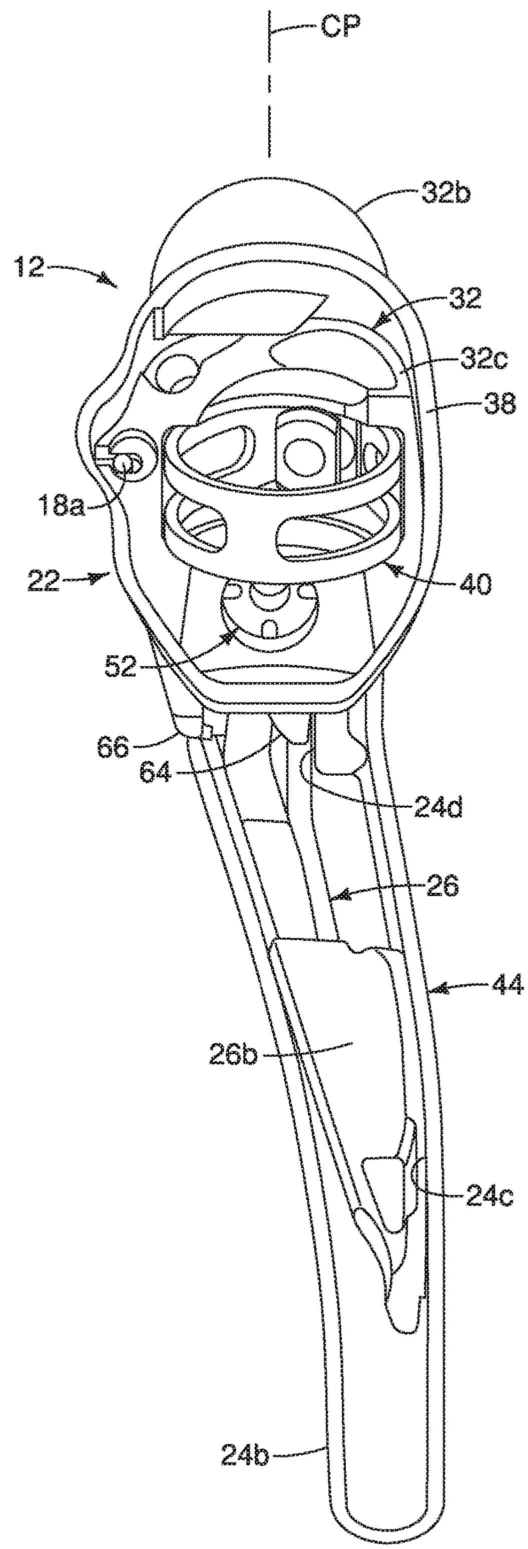
FIG. 6 is a rear elevational view of the right bicycle operating device illustrated in FIGS. 3 to 5 with the first and second operating members in their rest positions.

FIGS. 3, 5 and 6 illustrate the first and second user operating members 24 and 26 in their rest positions. FIGS. 4 and 8 illustrate the first operating member 24 in an operated position wherein the second operating member 26 moves with the first operating member 24. FIGS. 9 and 10 illustrate the second operating member 26 in an operated position and the first operating member 24 in the rest position. The term "rest position" as used herein refers to a state in which the part e.g., the first and second user operating members 24 and 26) remains stationary without the need of a user holding the part in that state corresponding to the rest position. The term "operated position" as used herein refers to a state in which the part (e.g., the first and second user operating members 24 and 26) is temporarily held by an external force (e.g., a user holding the part in a state corresponding to the operated position).

Figure 11:
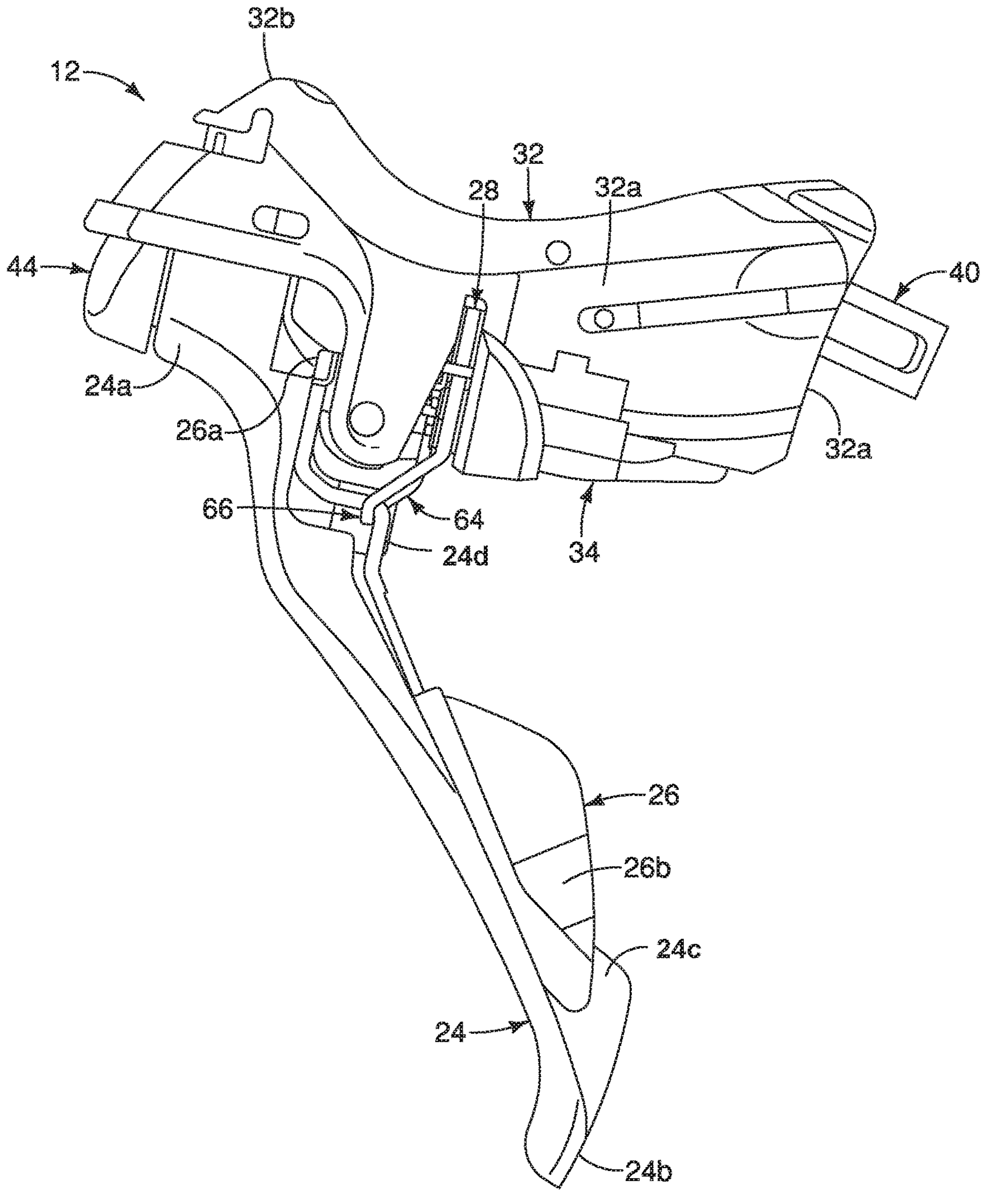
FIG. 11 is an inside elevational view of the right bicycle operating device illustrated in FIG. 10 but with a grip cover removed to reveal an operating unit cover that partially covers the operating unit (i.e., the shifting unit) that is retained in the base member.

As seen in FIG. 11, the base member 22 includes a main body 32 and an operating unit cover 34. Typically, the main body 32 and the operating unit cover 34 are made of a rigid, hard plastic material. The main body 32 defines the interior space 30 for receiving the operating unit 28. The operating unit cover 34 is detachably attached to the main body 32 by at least one fastener 36 (e.g., a screw). As explained below, when the operating unit 28 is removed from the main body 32 of the base member 22, the operating unit cover 34 is replaced with the attachment 16 which is attached to the main body 32 by the fastener 36. The attachment 16 is configured to prevent the first and second operating members 24 and 26 being moved in a direction corresponding to a shifting operation while allowing the first and second operating members 24 and 26 to be moved in a direction corresponding to a braking operation.

As seen in FIGS. 3 and 4, the main body 32 of the base member 22 pivotally supports the first and second user operating members 24 and 26. Riders sometimes grip the main body 32 and lean on the base main body 32 during riding. It is desirable to provide a comfortable feeling for the rider's hand while the rider is gripping the main body 32. Thus, the main body 32 is preferably covered with a soft outer elastomeric grip cover 38. The grip cover 38 partially covers the main body 32 as seen in FIGS. 3 and 4. In particular, the grip cover 38 is stretched over the main body 32 of the base member 22 in a conventional manner.

The base member 22 includes a handlebar mounting structure 40 for mounting the base member 22 to the drop handlebar H. Since the main body 32 is fixed to the drop handlebar H by the handlebar mounting structure 40, the base member 22 constitutes a fixed member with respect to the drop handlebar H. The handlebar mounting structure 40 is preferably a conventional band clamp or similar structure that is used in a road shifter for gripping the drop handlebar H. Since the handlebar mounting structure 40 can be any suitable mounting structure, the handlebar mounting structure 40 will not be discussed or illustrated in detail herein.

The main body 32 of the base member 22 is configured as a road shifter bracket that includes a grip portion 32*a* and a pommel portion 32*b*. The grip portion 32*a* is provided with a handlebar receiving recess 32*c* that is located at a first end (i.e., a rear or proximal end) of the grip portion 32*a*. The handlebar mounting structure 40 is partially mounted within the handlebar receiving recess 32*c* which receives a downwardly curved section of the drop handlebar H. The pommel portion 32*b* is disposed at an opposite end of the grip portion 32*a* from the handlebar receiving recess 32*c*. In other words, the pommel portion 32*b* is located at a second end (i.e., a front or distal end) of the grip portion 32*a*. The pommel portion 32*b* protrudes upwardly relative to the grip portion 32*a*. Thus, the grip portion 32*a* is disposed between the handlebar mounting structure 40 and the pommel portion 32*b*. Riders grip the grip portion 32*a* between the drop handlebar H and the pommel portion 32*b*. The base member 22 is a stationary member when mounted to the drop handlebar ET by the handlebar mounting structure 40.

Figure 12:
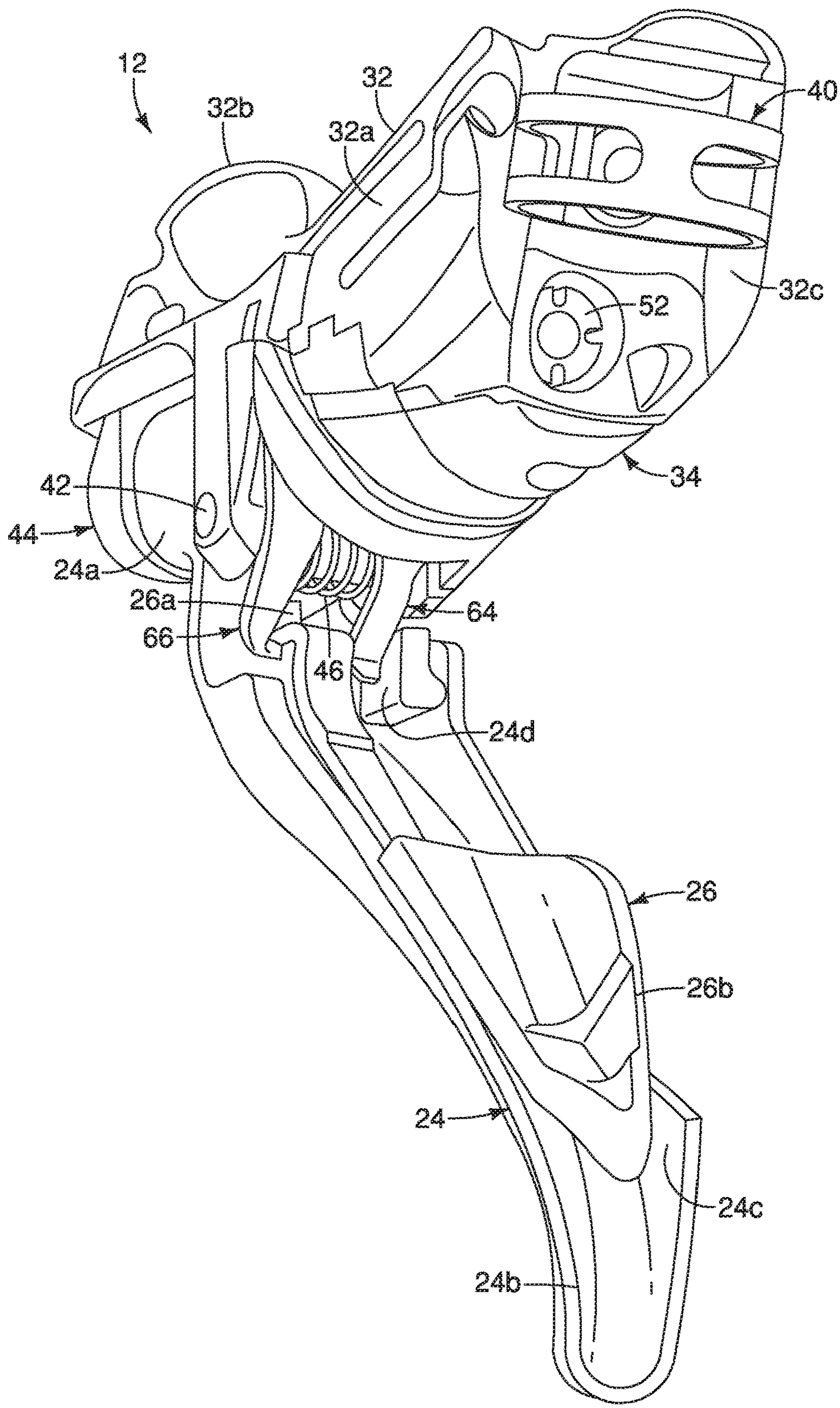
FIG. 12 is a first bottom perspective view of the right bicycle operating device illustrated in FIG. 11 with the grip cover removed to reveal the operating unit cover partially covering the operating unit.
Figure 13:
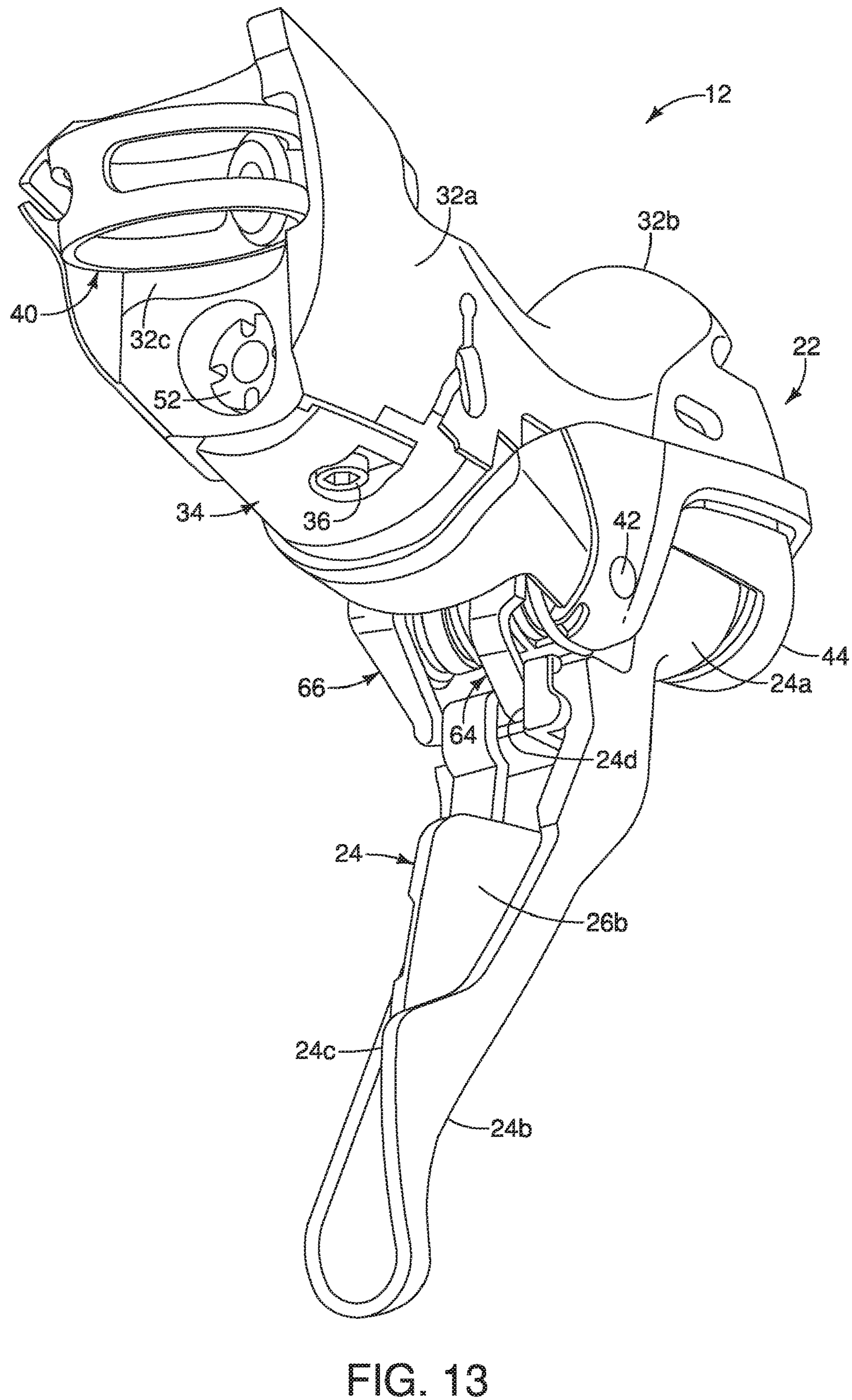
FIG. 13 is a second bottom perspective view of the right bicycle operating device illustrated in FIGS. 11 and 12 with the grip cover removed.
Figure 17:
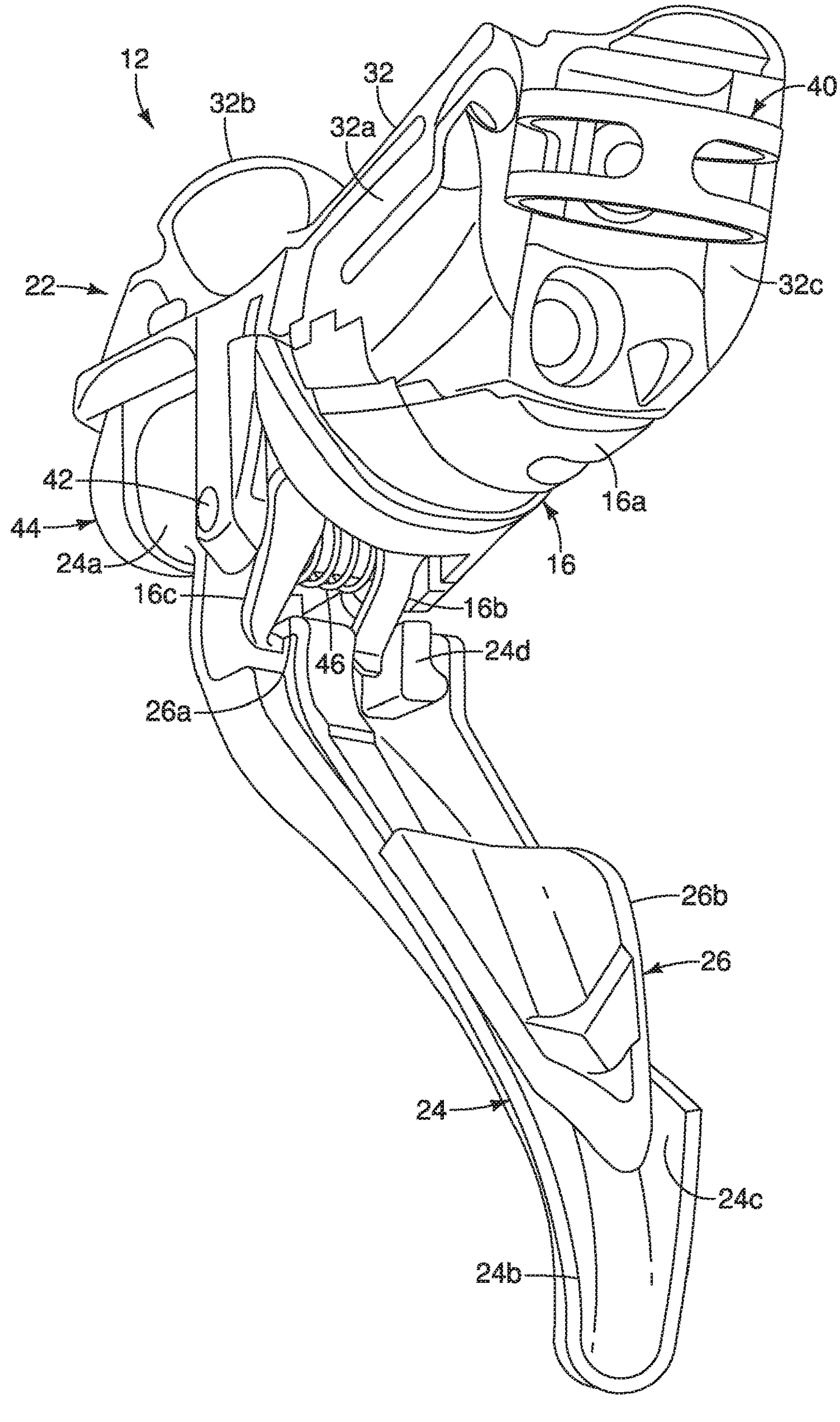
FIG. 17 is a bottom perspective view of the right bicycle operating device illustrated in FIGS. 11 to 14 with the operating unit removed and the attachment attached to the base member.
Figure 21:
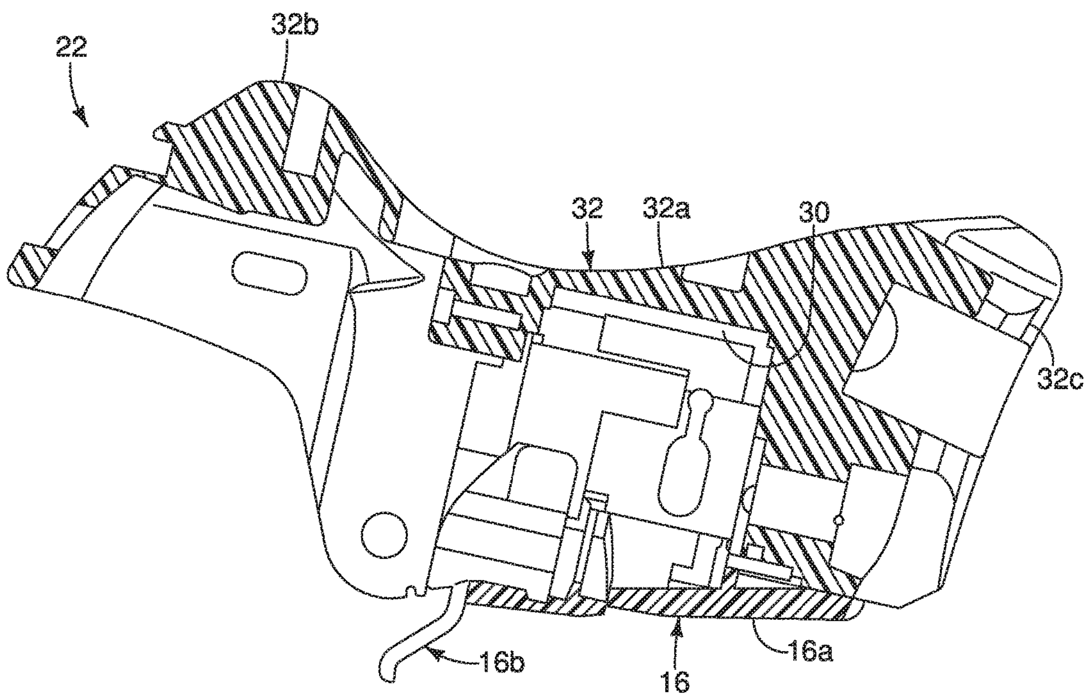
FIG. 21 is a cross sectional view of the base member of the right bicycle operating device illustrated in FIG. 10 with the attachment attached to the base member and the operating unit removed.
Figure 22:
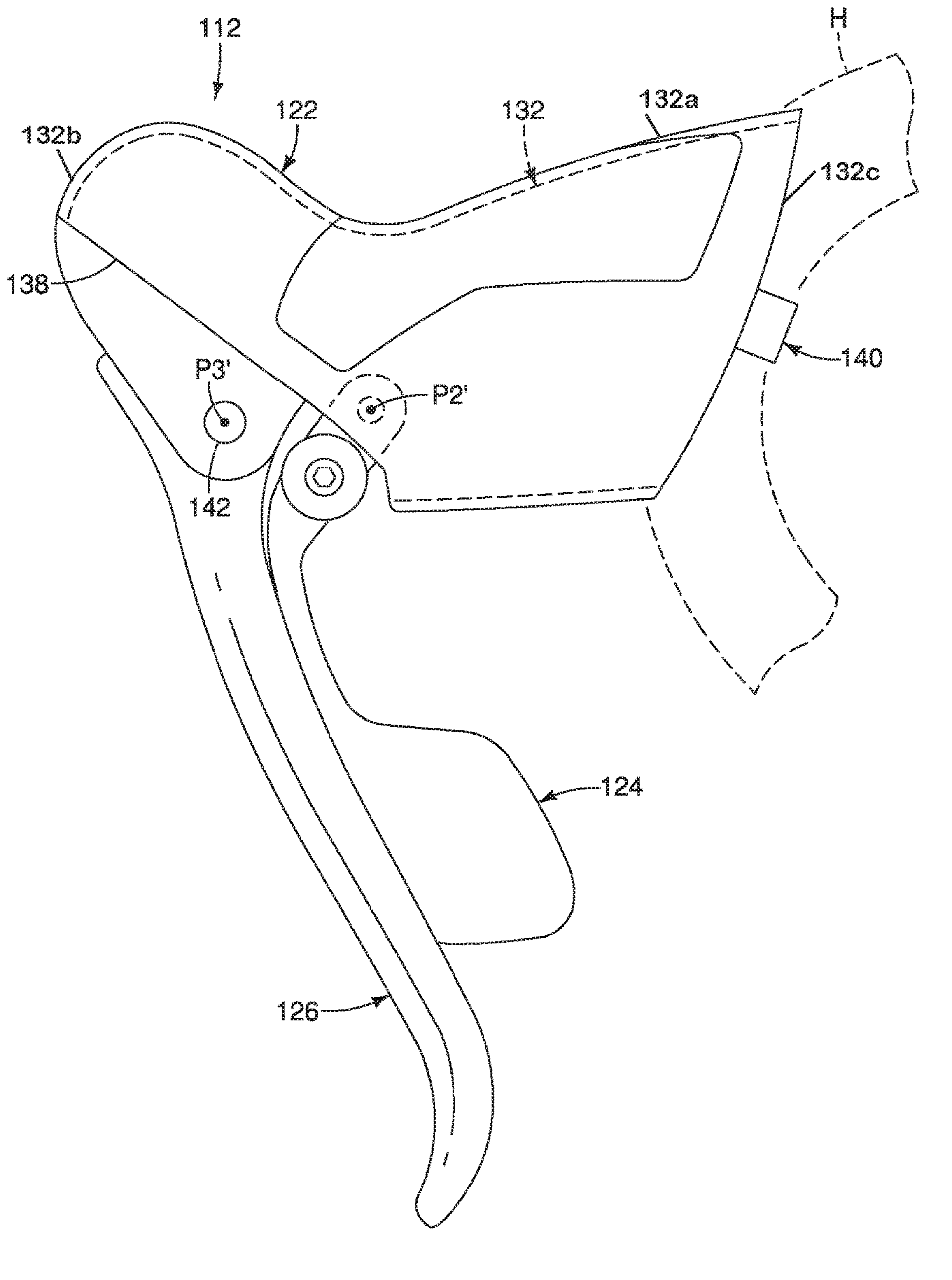
FIG. 22 is an inside elevational view of a portion of a bicycle equipped with a bicycle operating device in accordance with a second embodiment with first and second operating members in their rest positions (non-operated position) with respect to a base member that is supported on a handlebar.

As seen in FIGS. 11 to 13, the operating unit cover 34 defines a part of a downwardly facing bottom surface of the grip portion 32*a* when the operating unit cover 34 is attached to the grip portion 32*a* by the fastener 36. As explained below, when the operating unit 28 is removed from the main body 32 of the base member 22, the operating unit cover 34 is replaced with the attachment 16 which is attached to the main body 32 by the fastener 36. Similarly, as seen in FIGS. 17 and 21, the attachment 16 defines a part of a downwardly facing bottom surface of the grip portion 32*a* when the attachment 16 is attached to the grip portion 32*a* by the fastener 36. In this way, the attachment 16 is coupled to the base member 22 such that the main body 32 looks and feels the same to the user.

Figure 16:
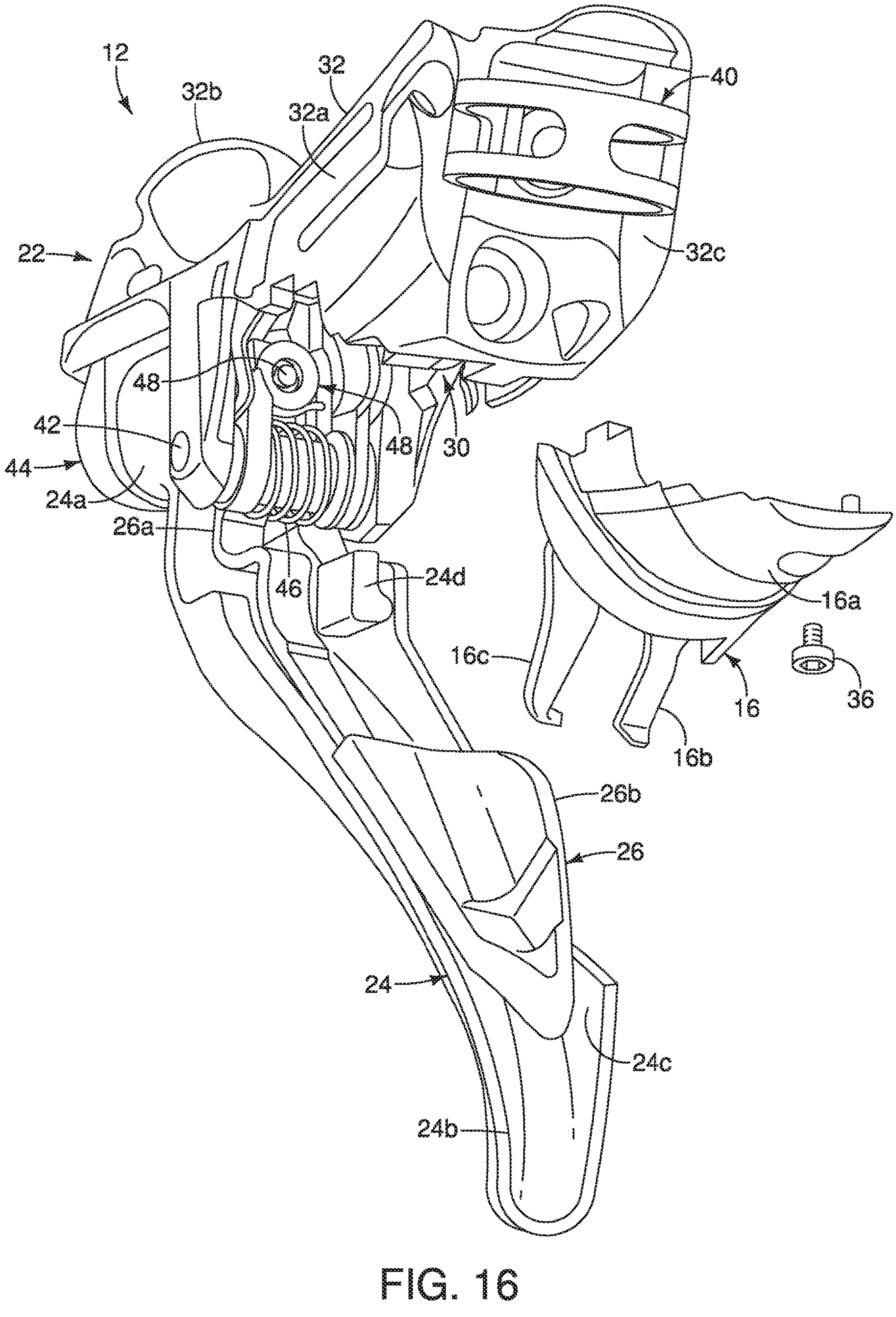
FIG. 16 is a partial exploded bottom perspective view of the right bicycle operating device illustrated in FIGS. 11 to 14 with the operating unit removed and the attachment ready to be attached to the base member.

In particular, as seen in FIGS. 16, 17 and 21, the attachment 16 has a fixed (body) portion 16*a* that basically extends across the bottom of the grip portion 32*a* to at least partially close off the entrance opening of the interior space 30 of the main body 32. Here, the fixed portion 16*a* of the attachment 16 is a curved member that is substantially the same shape as the operating unit cover 34. However, the attachment 16 only differs from the operating unit cover 34 in that the attachment 16 includes a first abutment 16*b* and a second abutment 16*c*. The first and second abutments 16*b* and 16*c* define an abutment portion of the attachment 16. Basically, the first and second abutments 16*b* and 16*c* are configured to render inoperable the shifting functions of the first and second user operating members 24 and 26 when the attachment 16 is attached to the main body 32. The first abutment 16*b* of the attachment 16 blocks the first operating path S1 to prevent movement of the first operating member 24 from reaching the operated position of the first operating member 24. In other words, the first abutment 16*b* blocks pivotal movement of the first operating member 24 from reaching the operated position of the first operating member 24. More preferably, the first abutment 16*b* of the attachment 16 substantially prevents movement of the first operating member 24 in a direction along the first operating path S1 from the rest position. In this way, the first operating member 24 basically does not move in a lateral direction with respect to a fore-aft center plane CP of the base member 22 except for manufacturing play due to manufacturing tolerances. The attachment 16 does not block the second operating path S2 allowing the first operating member 24 to reach the operated position of the first operating member 24. The second abutment 16*c* of the attachment 16 blocks the third operating path 53 to prevent movement of the second operating member 26 from reaching the operated position of the second operating member 26. In other words, the second abutment 16*c* blocks pivotal movement of the second operating member 26 from reaching the operated position of the second operating member 26. More preferably, the second abutment 16*c* of the attachment 16 substantially prevents movement of the second operating member 26 in a direction along the third operating path S3 from the rest position. In this way, the second operating member 26 basically does not move in a lateral direction with respect to the fore-aft center plane CP of the base member 22 except for manufacturing play due to manufacturing tolerances. The attachment 16 does not block the second operating path S2 allowing the second operating member 26 to reach the operated position of the second operating member 26.

As seen in FIGS. 3 and 4, the first operating member 24 is used to perform a braking operation. As seen in FIG. 4, the first operating member 24 is pivotally mounted relative to the base member 22 by a pivot pin 42 that is mounted to the base member 22. The pivot pin 42 defines the second pivot axis P2 (i.e., a brake pivot axis) that extends transverse to the lateral surfaces of the base member 22 to perform the braking operation. The pivot pin 42 is located in holes of pivot attachment portions of the base member 22.

In the illustrated embodiment, the first and second user operating members 24 and 26 are supported on a lever mounting member 44 that is pivotally attached to the base member 22 by the pivot pin 42. The inner wire 20*a* of the brake control cable 20 is connected to the lever mounting member 44 such that the inner wire 20*a* is pulled as the first operating member 24 pivoted on the pivot pin 42 from the rest position (FIG. 3) to the braking (actuated) position (FIG. 4). As explained below, the first operating member 24 is also used to perform a shifting operation (e.g., a cable pulling operation). Thus, the first operating member 24 constitutes a user brake/shift operating lever.

Figure 14:
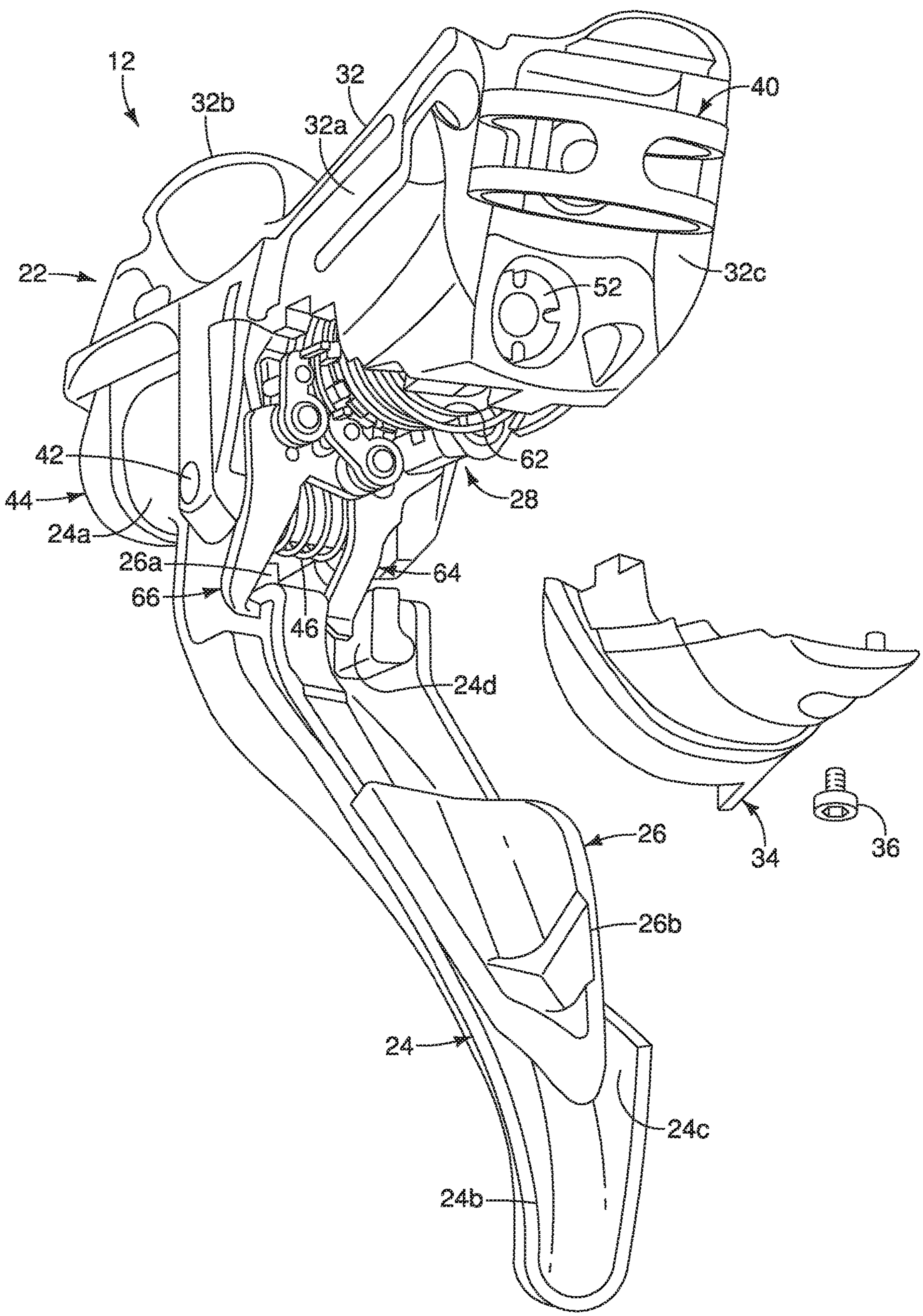
FIG. 14 is a third bottom perspective view of the right bicycle operating device illustrated in FIGS. 11 and 12 with the grip cover removed and the operating unit cover detached from the base member.
Figure 15:
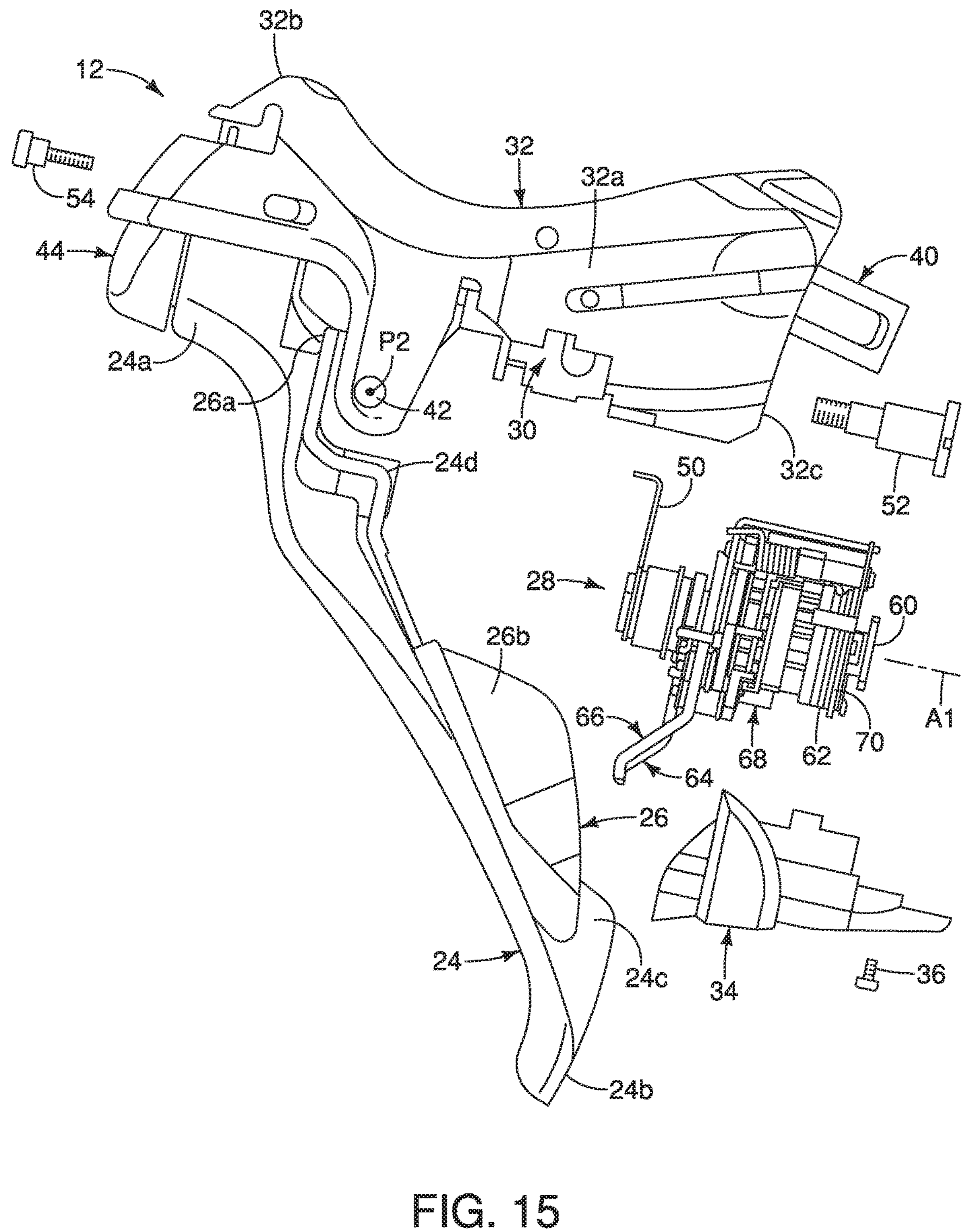
FIG. 15 is a partial exploded elevational view of the right bicycle operating device illustrated in FIGS. 11 to 14 with the operating unit (i.e., a shifting unit) and the operating unit cover detached from the base member.

As best seen in FIG. 14, a biasing element 46 is provided on the pivot pin 42 for biasing the lever mounting member 44 towards the rest position with respect to the base member 22 along the second operating path S2. Since the first and second user operating members 24 and 26 are mounted on the lever mounting member 44, both of the first and second user operating members 24 and 26 are also biased towards the rest position with respect to the base member 22 along the second operating path S2. In the illustrated embodiment, the biasing element 46 is a torsion spring with its coiled portion disposed on the pivot pin 42, a first free end contacting the base member 22 and a second free end contacting the lever mounting member 44. In this way, the first and second user operating members 24 and 26 are biased about the second pivot axis P2 towards the front end of the base member 22 and away from the drop handlebar H.

Specifically, the rider pivots the first operating member 24 about the second pivot axis P2 in a direction generally parallel to the bicycle longitudinal center plane for braking. As seen in FIGS. 3 and 4, this pivotal movement of the first operating member 24 from the rest position (FIG. 3) to the operated (braking) position (FIG. 4) along the second operating path S2 (i.e., a non-shift operating path B) pulls the inner wire 20*a* of the brake cable 20 to operate a brake device (not shown). Thus, the first operating member 24 functions as a brake lever. The second operating member 26 is pivotally attached to the lever mounting member 44, and moves together with the first operating member 24 and the lever mounting member 44 as the first operating member 24 is operated to perform the braking operation as seen in FIGS. 3 and 4.

Figure 7:
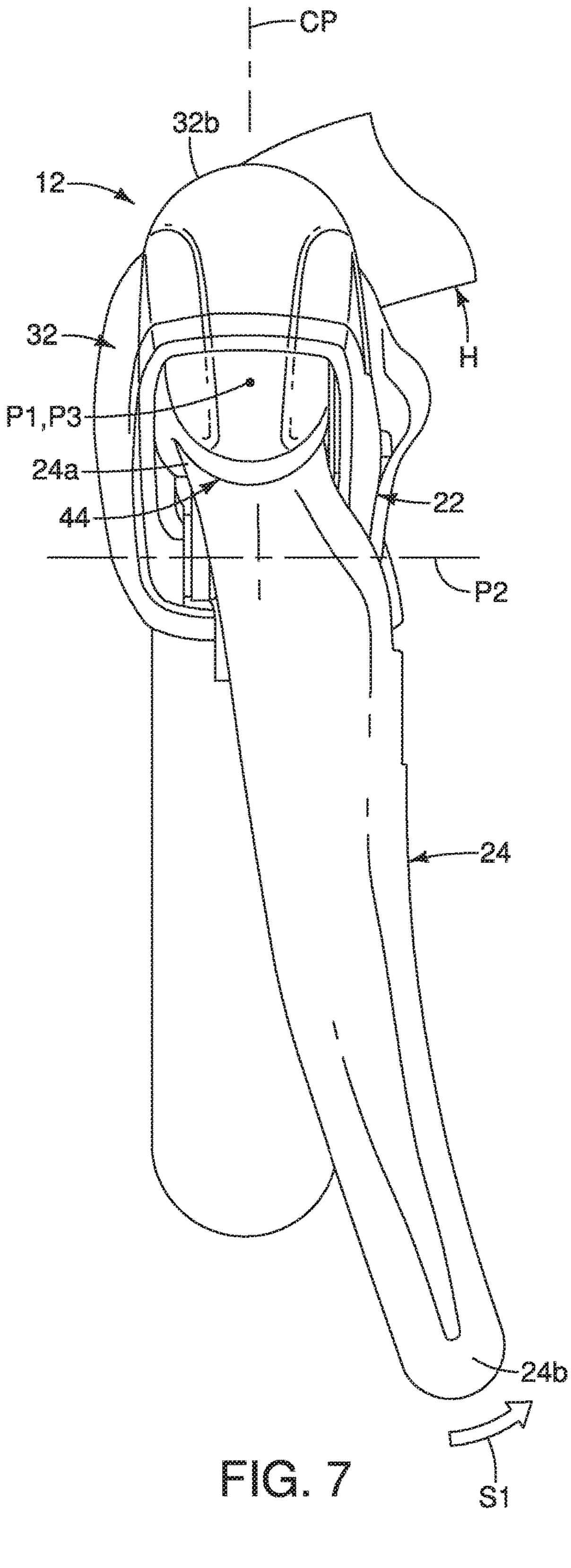
FIG. 7 is a front elevational view of the right bicycle operating device illustrated in FIGS. 3 to 6 with the first and second operating members moved to a cable pulling position in which the operating unit (i.e., the shifting unit) is operated.
Figure 8:
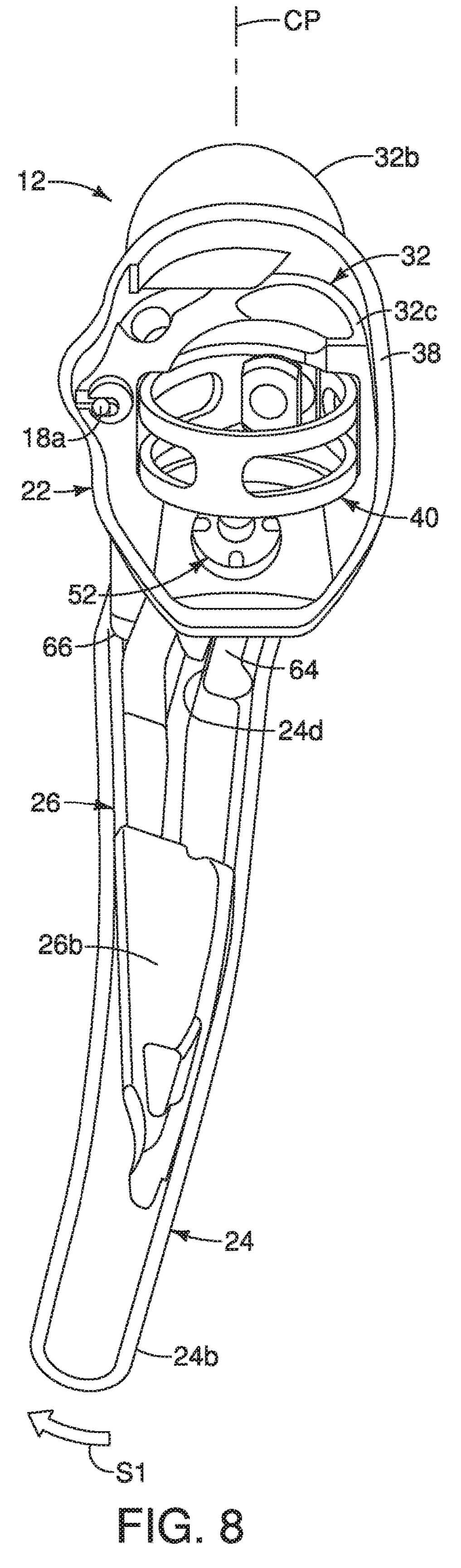
FIG. 8 is a rear elevational view of the right bicycle operating device illustrated in FIGS. 3 to 7 with the first and second operating members moved to the cable pulling position illustrated in FIG. 7.

As seen in FIGS. 7 and 8, the first operating member 24 pivots relative to the base member 22 along a shifting plane that is transverse to the braking plane of the first operating member 24 to perform a shifting operation. The first pivot axis P1 is non coaxial with respect to the second pivot axis P2. Specifically, the rider pivots the first operating member 24 about the first pivot axis P1 along the first operating path S1 towards a bicycle longitudinal center plane for shifting. This pivotal movement of the first operating member 24 from the rest position to the shift operated position operates the operating unit 28, which pulls the inner wire 18*a* of the shift cable 18. Thus, the first operating member 24 functions as a cable pulling lever in addition to acting as a brake lever as mentioned above. The second operating member 26 moves together with the first operating member 24 as the first operating member 24 is operated to perform the shifting operation as seen in FIG. 8. In particular, during a shifting operation using the first operating member 24, the first operating member 24 contacts the second operating member 26 during pivotal movement of the first operating member 24 about the first pivot axis P1 so that the first and second user operating members 24 and 26 move together. However, the second operating member 26 does not operate the operating unit 28 when the first operating member 24 is pivoted about the first pivot axis P1 to perform the shifting operation.

As seen in FIGS. 9 and 10, the second operating member 26 is operatively coupled to the operating unit 28 for performing a shifting operation (i.e., a cable releasing operation). In the illustrated embodiment, the second operating member 26 is used to release the inner wire 18*a* from the operating unit 28 when the second operating member 26 is pivoted about the third pivot axis P3 along the third operating path S3 towards the center longitudinal plane of the bicycle 1. Thus, the second operating member 26 constitutes as a cable releasing lever which operates the operating unit 28 to release the inner wire 18*a* from the operating unit 28. The second operating member 26 only performs shifting operations. FIG. 6 illustrates the second operating member 26 in the rest position, while FIG. 10 illustrates the second operating member 26 in an operated position. In particular, the second operating member 26 is pivotally mounted with respect to the lever mounting member 44 such that the second operating member 26 pivots relative to the first operating member 24 about the third pivot axis P3 between the rest position and the shifting (actuated) position. Here, the first pivot axis P1 is coaxial with the third pivot axis P3.

The first operating member 24 remains stationary or substantially stationary while the second operating member 26 is pivoted about the third pivot axis P3. In particular, the second operating member 26 can be pivoted independently of the first operating member 24 about the third pivot axis P3 along the third operating path S3 such that the first operating member 24 remains stationary. However, sometimes the rider might accidently contact the first operating member 24 while moving the second operating member 26 about the third pivot axis P3 along the third operating path S3 such that the first operating member 24 moves slightly with the second operating member 26.

As seen in FIG. 16, the first and second user operating members 24 and 26 are movably supported on the lever mounting member 44 by a pivot axle structure 48. In particular, the first operating member 24 has a mounting end 24*a* that is pivotally, attached to the lever mounting member 44 by the pivot axle structure 48. Similarly, the second operating member 26 also has a mounting end 26*a* that is also pivotally attached to the lever mounting member 44 by the pivot axle structure 48. The pivot axle structure 48 is disclosed in more detail in U.S. Pat. No. 9,056,597, which is assigned to shimano Inc.

Also a first biasing member (not shown) is provided between the first operating member 24 and the lever mounting member 44 for biasing the first operating member 24 about the first pivot axis PT toward the rest position. Likewise, a second biasing member (not shown) is provided between the second operating member 26 and the lever mounting member 44 for biasing the second operating member 26 about the third pivot axis P3 toward the rest position. In the first embodiment, the first and second biasing members are torsion swings that are disposed on the pivot axle structure 48 in the same manner as disclosed in U.S. Pat. No. 9,056,597.

The first operating member 24 has a user operating portion 24*b* that is disposed outside of the base member 22 for the rider to pivot the first operating member 24 about the first pivot axis P1 for shifting and about the second pivot axis P2 for braking. Similarly, the second operating member 26 has a user operating portion 26*b* that is disposed outside of the base member 22 for the rider to pivot the second operating member 26 about the third pivot axis P3 for shifting and about the second pivot axis P2 during a braking operation.

The first operating member 24 has an abutment 24*c* that contacts the second operating member 26 when the first operating member 24 is pivoted about the first pivot axis P1 to perform the shifting operation. In this way, the second operating member 26 is pivoted by the first operating member 24 when the first operating member 24 is pivoted about the first pivot axis P1 to perform a shifting operation. The first operating member 24 also has an abutment 24*d* that abuts a part of the operating unit 28 to operate the operating unit 28 as explained later.

Figure 18:
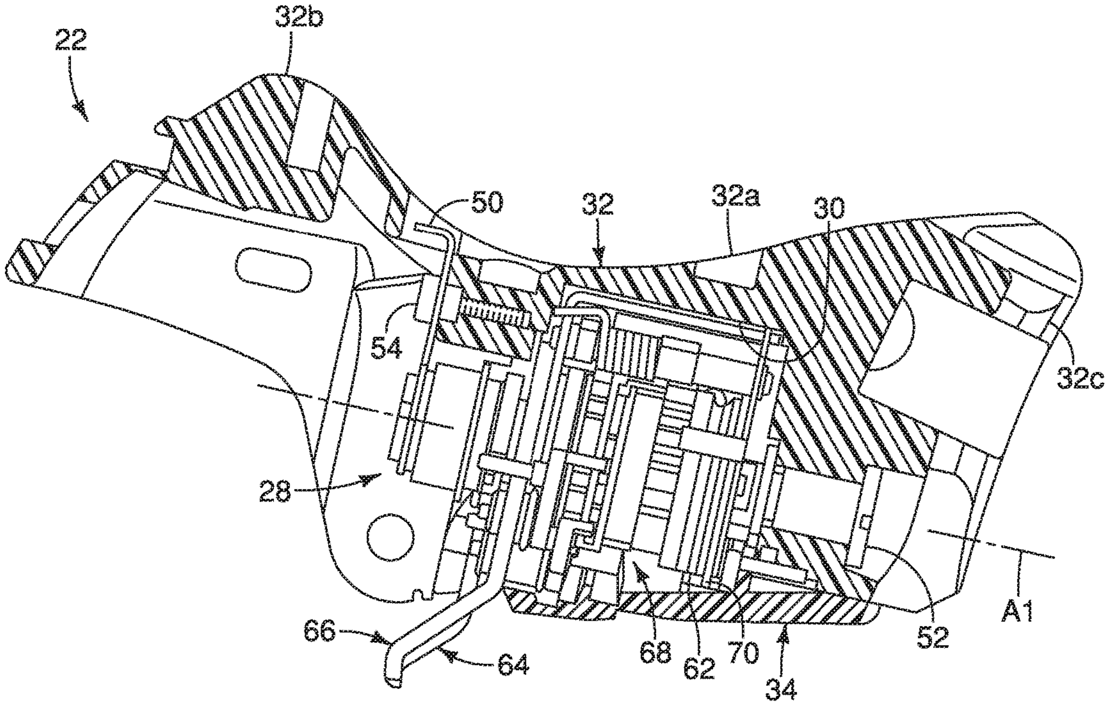
FIG. 18 is a cross sectional view of the base member and the cover of the right bicycle operating device illustrated in FIG. 10 with the operating unit and the operating unit cover attached to the base member.
Figure 19:
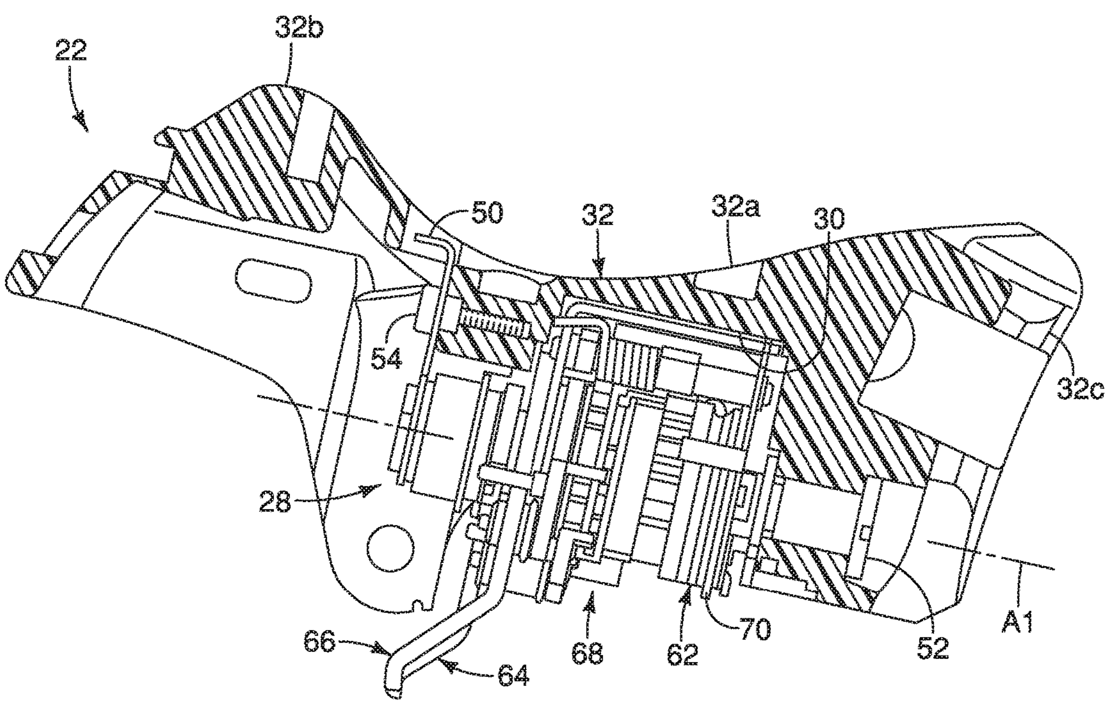
FIG. 19 is a cross sectional view of the base member of the right bicycle operating device illustrated in FIG. 10 with the operating unit attached to the base member and the operating unit cover removed.
Figure 20:
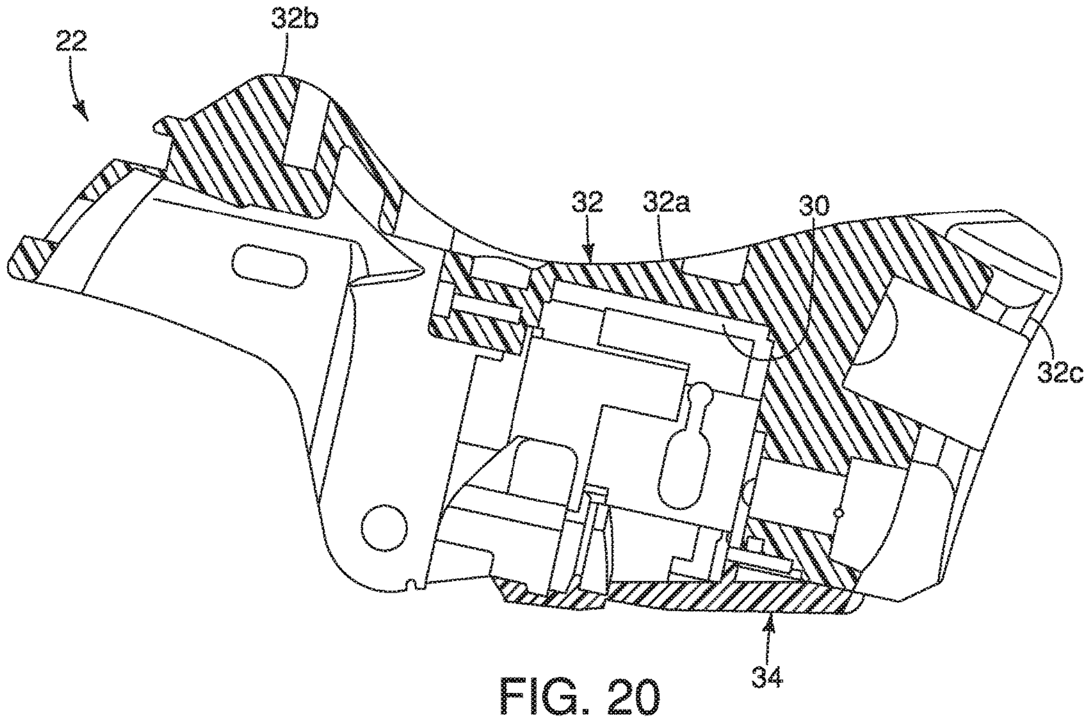
FIG. 20 is a cross sectional view of the base member of the right bicycle operating device illustrated in FIG. 10 with the operating unit cover attached to the base member and the operating unit removed.

As seen in FIGS. 16, 18 and 19, the operating unit 28 is mounted to the base member 22 by a mounting hanger 50 and a mounting bolt 52. The mounting hanger 50 supports the front end of the operating unit 28, while the mounting bolt 52 supports the rear end of the operating unit 28. The mounting hanger 50 is attached to the base member 22 by a screw 54 that is threaded into the base member 22. The mounting bolt 52 extends through a hole in the rear end of the base member 22, and is threaded into a rear end of an axle for the operating unit 28. In this way, the operating unit 28 is detachably disposed in the interior space 30. In other words, the interior space 30 is configured to removably receive the operating unit 28. With this attachment arrangement, the operating unit 28 is detachably and reinstallably mounted on the base member 22 without damage such that the operating unit 28 is detachable from the base member 22 as an integrated unit without detaching the first and second user operating members 24 and 26. Thus, the bicycle operating device 12 can still be used for performing a braking operation with the operating unit 28 removed from the interior space 30 of the base member 22.

Referring now to FIGS. 11 to 15, the operating unit 28 of the bicycle operating device 12 will now be discussed with respect to its operation by the first and second user operating members 24 and 26. However, since other operating units can be used with the other parts of the bicycle operating device 12 to carry out the present invention, the construction of the operating unit 28 will not be discussed in detail.

In the illustrated embodiment, the operating unit 28 is a shift unit that has a plurality predetermined operating positions (e.g., ten operating positions). More specifically, the operating unit 28 is a shift unit that pulls and releases the inner wire 18*a* such that the inner wire 18*a* is selectively held in one of the predetermined positions. However, it will be apparent from this disclosure that the operating unit 28 can be used in other bicycle component operating devices such as a bicycle suspension operating device and a bicycle adjustable seat-post operating device. Moreover, it will be apparent from this disclosure that the operating unit 28 can be a non-cable operating unit that is used in non-cable operating devices such as a hydraulic operating unit and a wireless operating unit if needed and/or desired.

In the illustrated embodiment, the operating unit 28 of the bicycle operating device 12 comprises, among other things, a support axle 60, a wire take-up member 62, a cable pulling structure 64, a cable releasing structure 66 and a positioning structure 68. The wire take-up member 62 is configured to rotate about a pivot axis A1 that is defined by the support axle 60. One end of the inner wire 18*a* is attached to the wire take-up member 62. Rotation of the wire take-up member 62 in a first rotational direction about the pivot axis A1 causes the inner wire 18*a* to be pulled into the interior space 30 of the base member 22, while other rotation of the wire take-up member 62 in a second (opposite) rotational direction about the pivot axis A1 causes the inner wire 18*a* to be released (payout) from the interior space 30 of the base member 22. The wire take-up member 62 is also biased about the pivot axis A1 in the second rotational direction by a biasing element 70. Here, in the illustrated embodiment, the biasing element 70 is a flat-coiled torsion spring. The biasing element 70 has a coiled portion that is wrapped around the shaft of the support axle 60. The biasing element 70 has a first free end portion that is disposed in a hole of the wire take-up member 62, and a second free end portion that is hooked onto a stationary part of the operating unit 28. In this way, the wire take-up member 62 is biased about the pivot axis A1 in a cable releasing direction by the biasing element 70 of the operating unit 28.

The cable pulling structure 64 and the cable releasing structure 66 are operatively coupled to the positioning structure 68. In response to operation of the first user operating member 24, the cable pulling structure 64 rotates the wire take-up member 62 in the first rotational direction about the pivot axis A1, and then the positioning structure 68 holds the wire take-up member 62 as the first user operating member 24 returns to the rest position. In this way, the positioning structure 68 holds the wire take-up member 62 to establish an operating position among the predetermined operating position of the operating unit 28. Similarly, in response to operation of the second user operating member 26, the cable releasing structure 66 engages the positioning structure 68 to release the wire take-up member 62 in the second rotational direction about the pivot axis A1. However, the positioning structure 68 limits the amount of rotation of the wire take-up member 62 in the second rotational direction about the pivot axis A1. Thus, as the second user operating member 26 returns to the rest position, the positioning structure 68 holds the wire take-up member 62 to establish an operating position among the predetermined operating position of the operating unit 28.

Referring now to FIGS. 22 to 28, a bicycle operating device 112 is illustrated in accordance with a second embodiment. Here, the bicycle operating device 112 is mounted to the drop handlebar H in a similar manner as in the first embodiment. The bicycle operating device 112 is a right hand side operating device that is operated by the rider's right hand. The bicycle operating device 112 is configured to be used for braking and shifting via control cables (not shown). However, as explained below, the bicycle operating device 112 can be modified to disable the shifting operation by using an attachment 116. Basically, the attachment 116 can be provided with the bicycle operating device 112 or can be provided separately for converting an existing bicycle operating device.

The bicycle operating device 112 basically comprises a base member 122, a first operating member 124, a second operating member 126 and an operating unit 128. Here, the base member 122 has an interior space 130 that is configured to receive the operating unit 128. Here, the first operating member 124 is operatively coupled to the operating unit 128 to operate the operating unit 128, which is a shift unit. The operating unit 128 pulls and releases a cable (not shown) to perform shifting operations in accordance with an amount of movement of the first operating member 124. The second operating member 126 is used solely for performing a braking operation.

Basically, the first operating member 124 is configured to move along a first operating path S1' from a rest position to an operated position to operate the operating unit 128 when the operating unit 128 is disposed in the interior space 130. In this second embodiment, the first operating member 124 pivots about a first pivot axis P1' when performing a shifting operation. In particular, the first operating member 124 moves along the first operating path S1' for a first distance D1 to perform a cable pulling operation of the operating unit 128 (i.e., the shifting unit) and moves along the first operating path S1' for a second distance D2 to perform a cable releasing operation of the operating unit 128 (i.e., the shifting unit). In other words, the first operating member 124 reaches a first shift position when the first operating member 124 has been moved to a point along the first operating path S1' that corresponds by the first distance D1 from the rest position of the first operating member 124. On the other hand, the first operating member 124 reaches a second shift position when the first operating member 124 has been moved to a point along the first operating path S1' that corresponds by the second distance D2 from the rest position of the first operating member 124. The first distance D1 is different from the second distance D2.

In the case of the bicycle operating device 112 disclosed herein, the first distance D1 is longer than the second distance D2. As a result, in order to perform the cable pulling operation, the first operating member 124 is moved continuously along the first operating path S1' past the second shift position to the first shift position without moving the first operating member 124 back towards the rest position until the first distance D1 has been reached. In this way, the operating unit 128 only performs a cable pulling operation. On the other hand, in order to perform the cable releasing operation, the first operating member 124 is moved continuously along the first operating path S1' to the second shift position and returned back towards the rest position before reaching the first shift position.

The first operating member 124 is also pivotally mounted relative to the base member 122 about a second pivot axis P2' to move along a second operating path S2' that is transverse to the first operating path S1'. Here, the first operating member 124 is moved along the second operating path S2' by the operation of the second operating member 126. In particular, the second operating member 126 is pivotally mounted relative to the base member 122 about a third pivot axis P3' to move along the third operating path S3'.

The base member 122 includes a main body 132 and an operating unit cover 134. Typically, the main body 132 and the operating unit cover 134 are made of a rigid, hard plastic material. The main body 132 defines the interior space 130 for receiving the operating unit 128. In particular, the operating unit cover 134 is detachably attached to the main body 132 by at least one fastener 136 screws). When the operating unit cover 134 is removed from the main body 132 of the base member 122, the attachment 116 is attached to the main body 132 by the fasteners 136. The attachment 116 overlies the operating, unit 128, and is configured to prevent the first operating member 124 being moved in a direction corresponding to a shifting operation while allowing the first and second operating members 124 and 126 to be moved in a direction corresponding to a braking operation.

Figure 23:
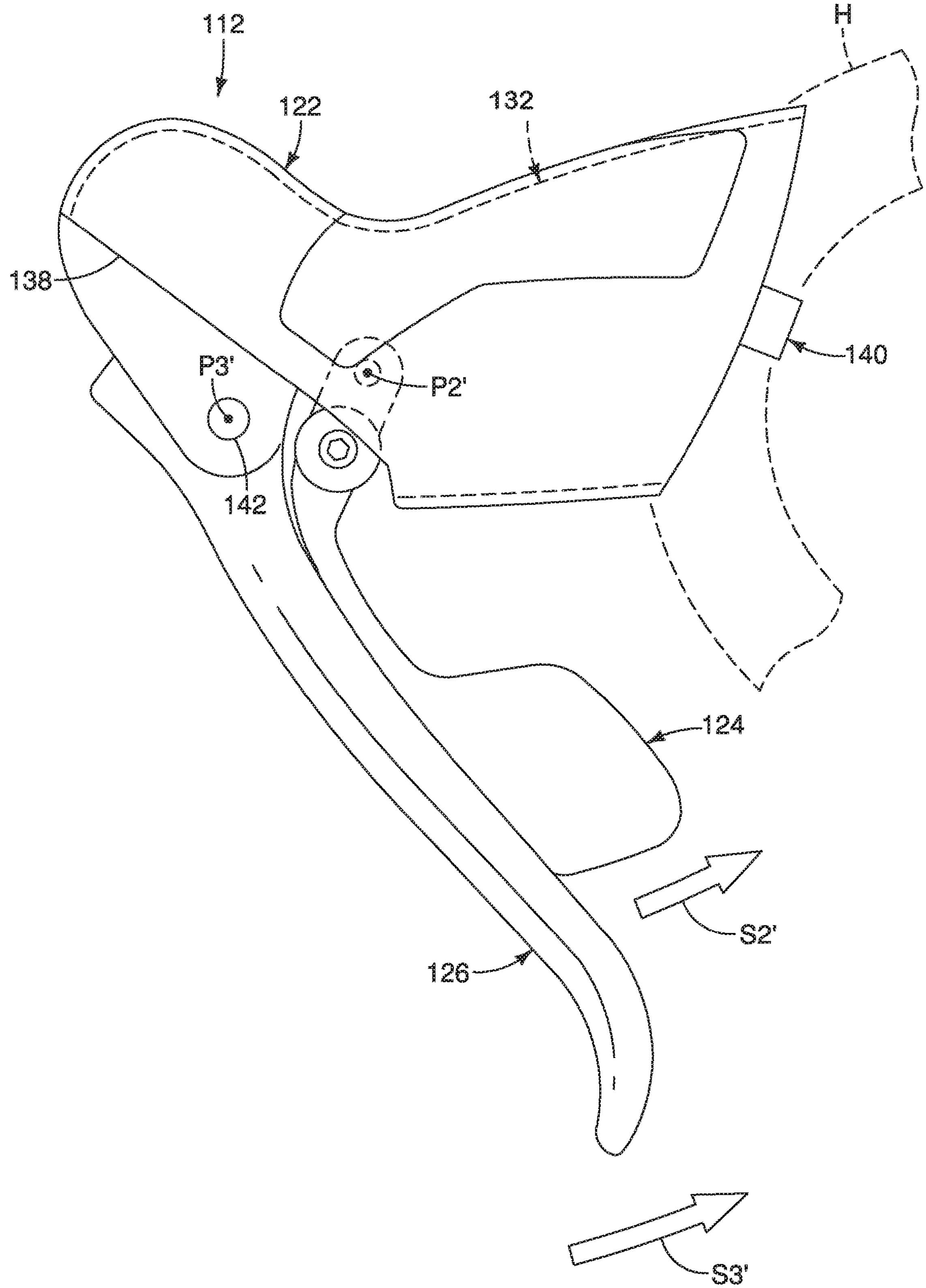
FIG. 23 is an inside elevational view of the bicycle operating device illustrated in FIG. 22 with the first and second operating members pivoted to a braking position.
Figure 24:
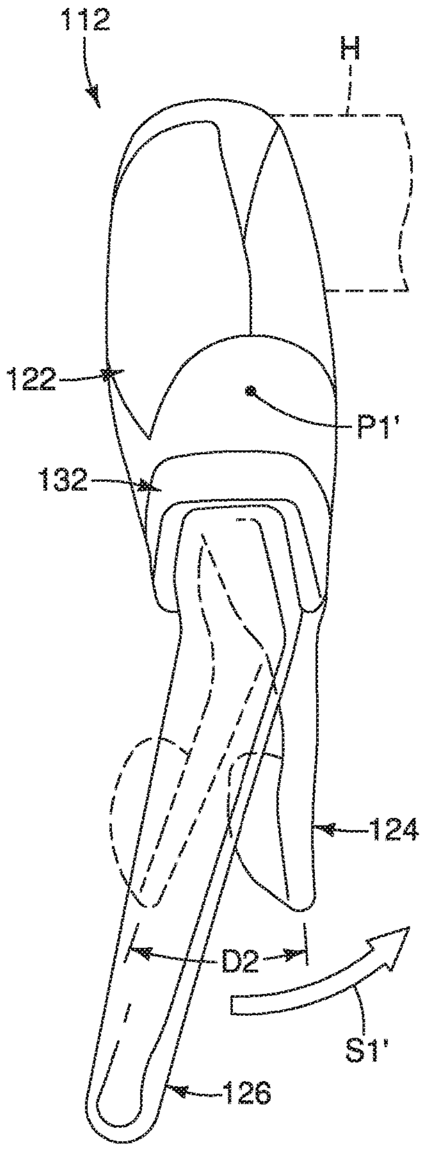
FIG. 24 is a front oblique view of the bicycle operating device illustrated in FIGS. 22 and 23 with the first operating member pivoted to perform a cable releasing operation while the second operating member is in its rest position.
Figure 25:
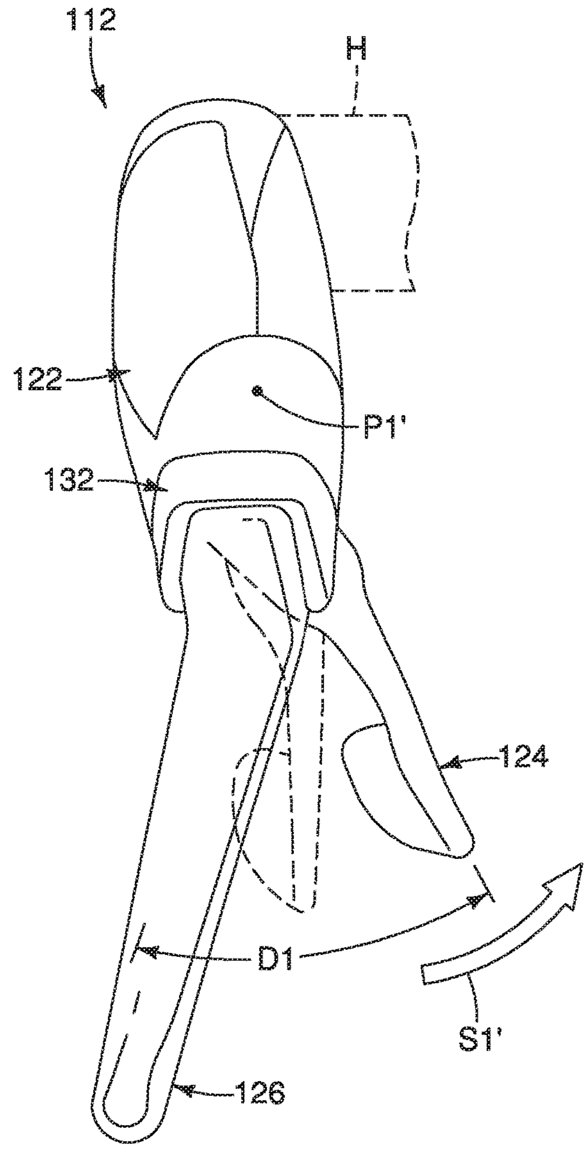
FIG. 25 is a front oblique view, similar to FIG. 24, of the bicycle operating device illustrated in FIGS. 22 to 24 with the first operating member pivoted to perform a cable pulling operation while the second operating member is in its rest position.
Figure 26:
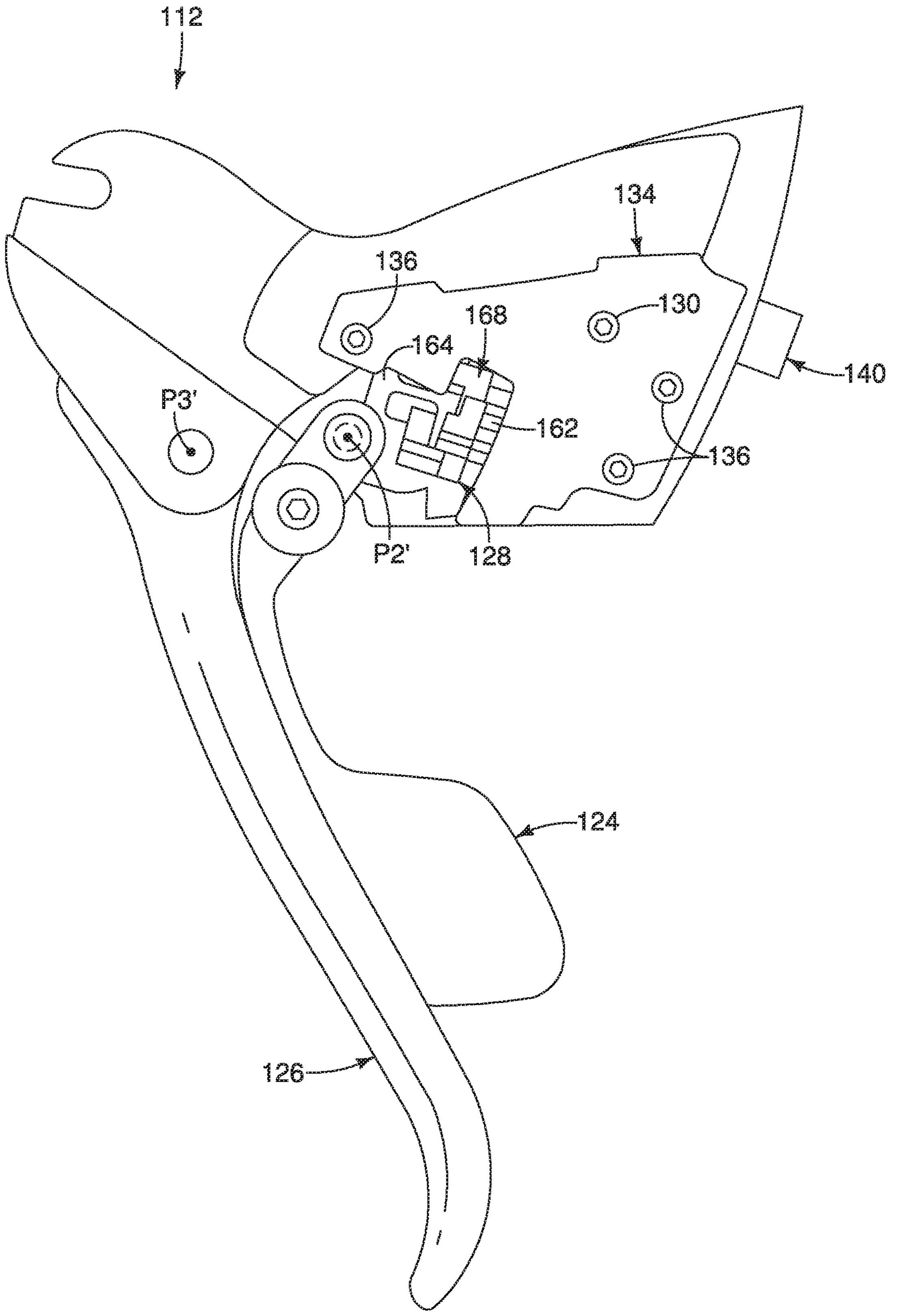
FIG. 26 is an inside elevational view of the bicycle operating device illustrated in FIG. 22 but with a grip cover removed to reveal an operating unit cover that partially covers an operating unit (i.e., the shifting unit) that is retained in the base member.
Figure 27:
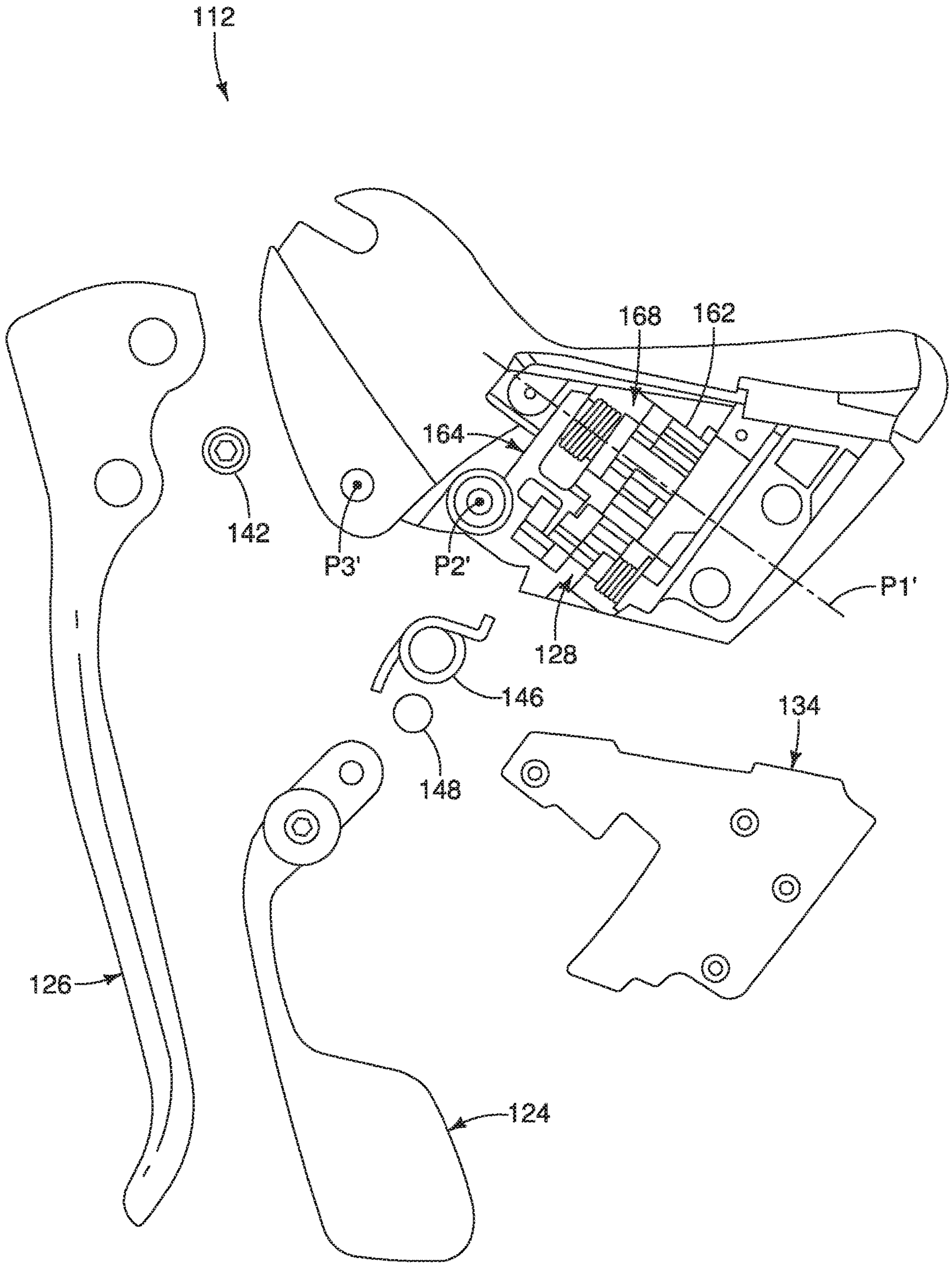
FIG. 27 is an inside elevational view of the bicycle operating device illustrated in FIG. 26 but with an operating unit cover detached from the base member.
Figure 28:
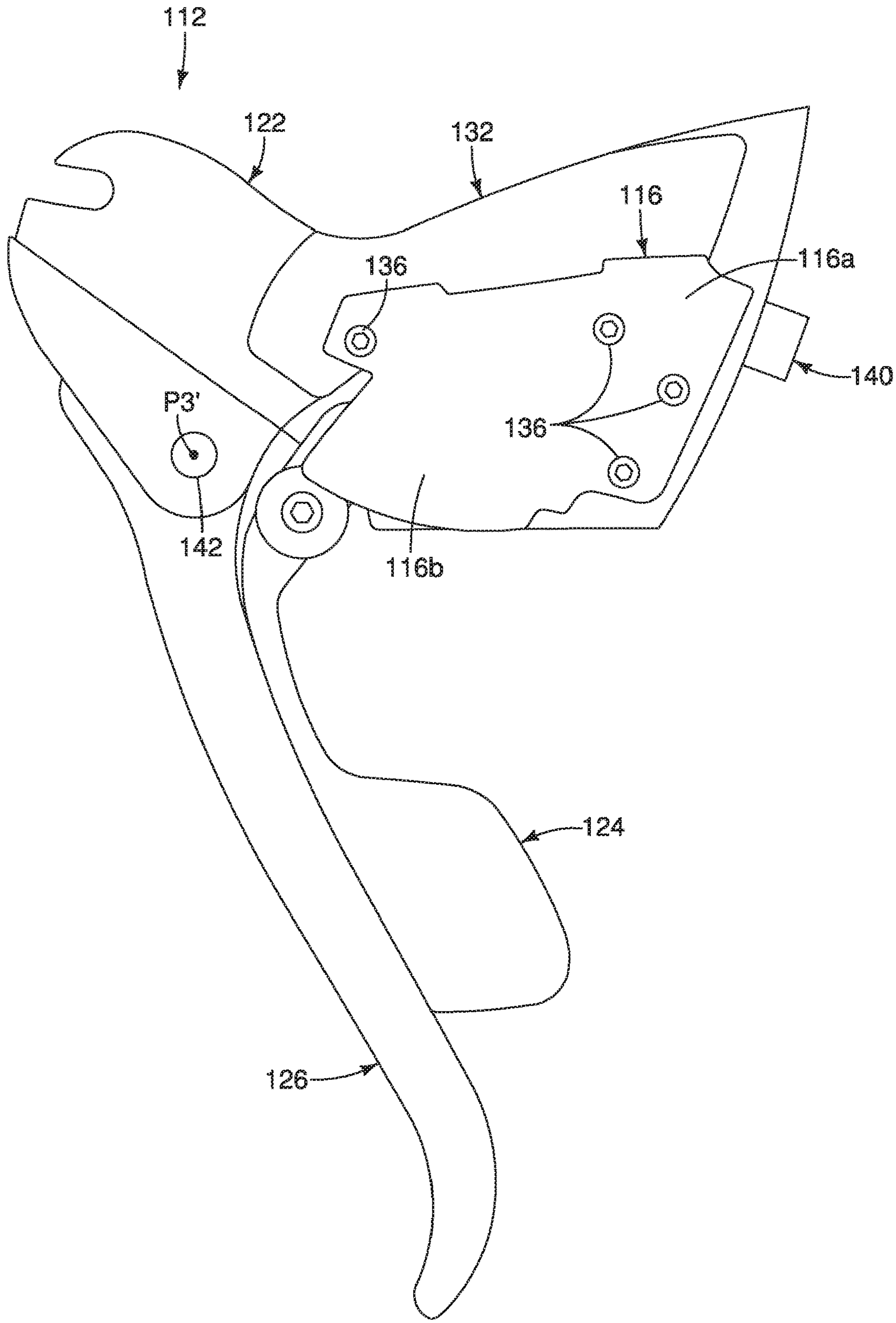
FIG. 28 is an inside elevational view of the bicycle operating device illustrated in FIG. 26 but with attachment attached to the base member to hold the operating unit in an inoperable state.

As seen in FIGS. 23 to 25, the main body 132 of the base member 122 pivotally supports the first and second user operating members 124 and 126. Since the main body 132 is often gripped and lean on by the rider during riding, it is desirable to provide a comfortable feeling for the rider's hand. Thus, the main body 132 is preferably covered with a soft outer elastomeric grip cover 138. The grip cover 138 partially covers the main body 132 as seen in FIGS. 23 to 25. In particular, the grip cover 138 is stretched over the main body 132 of the base member 122 in a conventional manner.

The base member 122 includes a handlebar mounting structure 140 for mounting the base member 122 to the drop handlebar H. Since the main body 132 is fixed to the drop handlebar H by the handlebar mounting structure 140, the base member 122 constitutes a fixed member with respect to the drop handlebar H. The handlebar mounting structure 140 is preferably a conventional band clamp or similar structure that is used in a road shifter for gripping the drop handlebar H. Since the handlebar mounting structure 140 can be any suitable mounting structure, the handlebar mounting structure 140 will not be discussed or illustrated in detail herein.

The main body 132 of the base member 122 is configured as a road shifter bracket that includes a grip portion 132*a* and a pommel portion 132*b*. The grip portion 132*a* is provided with a handlebar receiving recess 132*c* that is located at a first end (i.e., a rear or proximal end) of the grip portion 132*a*, The operating unit cover 134 defines a part of an inwardly facing side surface of the grip portion 132*a* when the operating unit cover 134 is attached to the grip portion 132*a* by the fasteners 136. Similar to the first embodiment, when the operating unit 128 is removed from the main body 132 of the base member 122, the operating unit cover 134 is replaced with the attachment 116 which is attached to the main body 132 by the fasteners 136. Similarly, the attachment 116 defines a part of an inwardly facing side surface of the grip portion 132*a*. Here, the attachment 116 retains the operating unit 128 in the interior space 130.

The second operating member 126 is pivotally mounted relative to the main body 132 of the base member 122 by a pivot pin 142 that is mounted to the main body 132. The pivot pin 142 defines a third pivot axis P3' (i.e., a brake pivot axis) that extends transverse to the lateral surfaces of the main body 132 to perform the braking operation. The pivot pin 142 is located in holes of pivot attachment portions of the main body 132. The first and second user operating members 124 and 126 are biased towards their rest positions by a biasing element 146 (e.g., a torsion spring). The biasing element 146 is mounted to the main body 132 by a pivot pin 148 that also pivotally mounts the first operating member 124 to the main body 132. The pivot pin 148 is coincident with the second pivot axis P2' such that the first operating member 124 can move along the second operating path ST when the second operating member 126 is pivoted on the pivot pin 142 to perform a braking operation.

The attachment 116 has a fixed (body) portion 116*a* and an abutment portion 116*b*. The fixed (body) portion 116*a* is mounted to the main body 132 by the fasteners 136 that are used to mount the operating unit cover 134 to the main body 132. The abutment portion 116*b* is configured to prevent the first operating member 124 from pivoting on the first pivot axis P1' along the first operating path S1'. Thus, with the attachment 116 mounted to the main body 132, the first operating member 124 cannot reach a shift position that will operate the operating unit 128 to change the current operating position of the operating unit 128.

Preferably, the operating unit 128 is a shift unit that has a plurality predetermined operating positions (e.g., ten operating positions). More specifically, the operating unit 128 is a shift unit that pulls and releases an inner wire such that the inner wire is selectively held in one of the predetermined positions. In the illustrated embodiment, the operating unit 128 of the bicycle operating device 112 comprises, among other things, a wire take-up member 162, a cable pulling-releasing structure 164 and a positioning structure 168.

One end of an inner wire is attached to the wire take-up member 162. Rotation of the wire take-up member 162 in a first rotational direction causes the inner wire to be pulled into the interior space 130 of the base member 122, while other rotation of the wire take-up member 162 in a second (opposite) rotational direction causes the inner wire to be released (payout) from the interior space 130 of the base member 122. The wire take-up member 162 is biased in a cable releasing direction.

The operating unit 128 has the same structure and operated in the same way as the so called holding mechanism that is disclosed in U.S. Pat. No. 7,779,718. The so called holding mechanism disclosed in U.S. Pat. No. 7,779,718 corresponds to the cable pulling-releasing structure 164 and the positioning structure 168 of the operating unit 128. In other words, the operating unit 128 is operated in the same manner as the control lever for the so called holding mechanism that is disclosed in U.S. Pat. No. 7,779,718. Since the structure and operations of the operating unit 128 are well known to those skilled in the bicycle field, the structure and operations of the operating unit 128 will not be discussed in detail herein.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle operating device. Accordingly, these directional terms, as utilized to describe the bicycle operating device should be interpreted relative to a bicycle in an upright riding position on a horizontal surface and that is equipped with the bicycle operating device. The terms "left" and "tight" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term “attached” or “attaching”, as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, “joined”, “connected”, “coupled”, “mounted”, “bonded”, “fixed” and their derivatives. Finally, terms of degree such as “substantially”, “about” and “approximately” as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function.

In other words, the particular shape of the attachment can depend on the shape of bicycle operating device. Also the attachment can be configured to be used with other types of bicycle operating devices such as a bicycle operating device that only has a single dual function lever (e.g., U.S. Patent Application Publication No. 2015/0151812). Thus, basically, the attachment is provided for a bicycle operating device that includes an operating member. However, typically as discussed above in the two illustrated embodiments, the attachment comprises a fixed portion and an abutment portion. The fixed portion is configured to be coupled to the bicycle operating device, while the abutment portion blocks a first operating path of the operating member to prevent operating movement of the operating member.

Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle operating device comprising:

a base member having an interior space configured to receive an operating unit;

a first operating member configured to move along a first operating path from a rest position to an operated position to operate the operating unit when the operating unit is disposed in the interior space; and an attachment blocking the first operating path to prevent movement of the first operating member from reaching the operated position in the condition that the attachment is non-movably attached to the base member, the attachment being removably attached to the base member, wherein the attachment defines a part of an exterior surface of the base member, the exterior surface of the base member facing a direction away from the interior space, the attachment having an abutment portion blocking a first operating path of the operating member to prevent operating movement of the operating member, the abutment portion protruding exteriorly from the exterior surface of the base member.

2. The bicycle operating device according to claim 1, wherein the first operating member is pivotally mounted relative to the base member about a first pivot axis to move along the first operating path.

3. The bicycle operating device according to claim 2, wherein the first operating member is a lever that is pivotally mounted relative to the base member about a second pivot axis to move along a second operating path, the first pivot axis being transversely arranged with respect to the second pivot axis.

4. The bicycle operating device according to claim 2, further comprising a second operating member configured to move along a third operating path from a rest position to an operated position to operate the operating unit when the operating unit is disposed in the interior space, and the attachment blocking the third operating path to prevent movement of the second operating member from reaching the operated position of the second operating member.

5. The bicycle operating device according to claim 4, wherein the first operating member is a lever that is pivotally mounted relative to the base member about a second pivot axis to move along a second operating path, the first pivot axis being transversely arranged with respect to the second pivot axis, and the second operating member is a lever that is pivotally mounted relative to the base member about a third pivot axis to move along the third operating path.

6. The bicycle operating device according to claim 5, wherein the attachment includes a first abutment and a second abutment;

the first abutment blocks pivotal movement of the first operating member from reaching the operated position of the first operating member; and the second abutment blocks pivotal movement of the second operating member from reaching the operated position of the second operating member.

7. The bicycle operating device according to claim 1, further comprising a second operating member configured to move along a third operating path from a rest position to an operated position to operate the operating unit when the operating unit is disposed in the interior space.

8. The bicycle operating device according to claim 7, wherein the attachment blocks the third operating path to prevent movement of the second operating member from reaching the operated position of the second operating member.

9. The bicycle operating device according to claim 8, wherein the second operating member is pivotally mounted relative to the base member about a third pivot axis to move along the third operating path.

10. The bicycle operating device according to claim 9, wherein the second operating member is pivotally mounted on the first operating member.

11. The bicycle operating device according to claim 1, wherein the interior space is configured to removably receive the operating unit.

12. The bicycle operating device according to claim 1, wherein the operating unit is a shifting unit.

13. The bicycle operating device according to claim 1, wherein the attachment is coupled to the base member.

14. The bicycle operating device according to claim 1, wherein the base member is configured as a road shifter bracket including a grip portion with a handlebar receiving recess and a pommel portion that is disposed at an opposite end of the grip portion from the handlebar receiving recess.

15. The bicycle operating device according to claim 14, wherein the attachment defines a part of a downwardly facing bottom surface of the grip portion.

16. The bicycle operating device according to claim 14, wherein the operating unit is detachably disposed in the interior space; and the attachment retains the operating unit in the interior space.

17. The bicycle operating device according to claim 1, further comprising a second operating member is pivotally mounted relative to the base member about a pivot axis to move along a second operating path that is transverse to the first operating path of the first operating member.

18. The bicycle operating device according to claim 17, wherein the first operating member is pivotally mounted relative to the base member about another pivot axis to move along the first operating path that is transverse to the second operating path of the first operating member.

19. The bicycle operating device according to claim 17, wherein the operating unit is detachably disposed in the interior space; and the attachment retains the operating unit in the interior space.

* * * * *